United States Patent
Park

(10) Patent No.: US 11,520,121 B2
(45) Date of Patent: *Dec. 6, 2022

(54) HIGH RESOLUTION LENS MODULE

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 327 days.

This patent is subject to a terminal disclaimer.

(21) Appl. No.: 16/696,070

(22) Filed: Nov. 26, 2019

(65) Prior Publication Data
US 2020/0096741 A1 Mar. 26, 2020

Related U.S. Application Data

(63) Continuation of application No. 16/152,452, filed on Oct. 5, 2018, now Pat. No. 10,545,317, which is a (Continued)

(30) Foreign Application Priority Data

Jun. 17, 2014 (KR) .......................... 10-2014-0073657
Oct. 13, 2014 (KR) .......................... 10-2014-0137760

(51) Int. Cl.
*G02B 9/62* (2006.01)
*G02B 13/00* (2006.01)

(52) U.S. Cl.
CPC ............ *G02B 9/62* (2013.01); *G02B 13/0045* (2013.01)

(58) Field of Classification Search
CPC ................ G02B 13/0045; G02B 13/18; G02B 27/0025; G02B 3/04; G02B 9/62; G02B 9/64; G02B 13/005; G02B 5/326
See application file for complete search history.

(56) References Cited

U.S. PATENT DOCUMENTS 8,477,431 B2 7/2013 Huang
8,891,177 B2 11/2014 Huang
(Continued)

FOREIGN PATENT DOCUMENTS

CN 202256850 U 5/2012
CN 104101988 A 10/2014
(Continued)

OTHER PUBLICATIONS

Chinese Office Action dated Dec. 9, 2019 in counterpart of Chinese Patent Application No. 201810155056.2 (10 pages in English and 6 pages in Chinese).

(Continued)

*Primary Examiner* — Darryl J Collins
*Assistant Examiner* — Tamara Y. Washington
(74) *Attorney, Agent, or Firm* — NSIP Law

(57) ABSTRACT

A lens module includes a first lens having positive refractive power, a second lens having positive refractive power, a third lens having negative refractive power, a fourth lens having positive refractive power, a fifth lens having positive or negative refractive power, and a sixth lens having negative refractive power. One or more inflection points may be formed on an image-side surface of the sixth lens.

20 Claims, 40 Drawing Sheets

Related U.S. Application Data continuation of application No. 14/664,111, filed on Mar. 20, 2015, now Pat. No. 10,133,030.

(56) References Cited

U.S. PATENT DOCUMENTS

| | | | |
|---|---|---|---|
| 9,046,672 B2 | 6/2015 | You | |
| 9,274,308 B2 | 3/2016 | Nabeta | |
| 10,133,030 B2* | 11/2018 | Park | G02B 13/0045 |
| 2012/0057249 A1 | 3/2012 | Yamamoto | |
| 2012/0188654 A1 | 7/2012 | Huang | |
| 2012/0194726 A1 | 8/2012 | Huang et al. | |
| 2012/0243108 A1 | 9/2012 | Tsai et al. | |
| 2012/0314301 A1 | 12/2012 | Huang et al. | |
| 2012/0314304 A1 | 12/2012 | Huang | |
| 2014/0036142 A1* | 2/2014 | Inoko | G02B 13/22 359/649 |
| 2014/0071543 A1 | 3/2014 | Shinohara | |
| 2014/0078603 A1 | 3/2014 | You | |
| 2014/0111873 A1 | 4/2014 | Huang | |
| 2014/0111876 A1 | 4/2014 | Tang et al. | |
| 2014/0192422 A1 | 7/2014 | Tang et al. | |
| 2014/0218598 A1 | 8/2014 | Yeh et al. | |
| 2014/0293458 A1 | 10/2014 | Nabeta | |
| 2014/0320980 A1 | 10/2014 | Chen | |
| 2014/0320981 A1 | 10/2014 | Hsieh et al. | |
| 2015/0029599 A1* | 1/2015 | Huang | G02B 13/0045 359/713 |
| 2015/0042862 A1 | 2/2015 | Huang | |
| 2015/0160435 A1 | 6/2015 | Chen et al. | |
| 2015/0160436 A1 | 6/2015 | Chen et al. | |
| 2015/0192760 A1 | 7/2015 | Huang | |
| 2015/0212296 A1 | 7/2015 | Huang et al. | |
| 2015/0316749 A1 | 11/2015 | Chen | |
| 2015/0316750 A1 | 11/2015 | Dai et al. | |
| 2015/0338609 A1 | 11/2015 | Hsu et al. | |
| 2015/0362703 A1 | 12/2015 | Park | |
| 2016/0124189 A1 | 5/2016 | Park | |
| 2016/0178871 A1 | 6/2016 | You | |
| 2017/0108667 A1 | 4/2017 | Sekine | |
| 2017/0108668 A1 | 4/2017 | Sekine | |

FOREIGN PATENT DOCUMENTS

| | | |
|---|---|---|
| JP | 2011-85733 A | 4/2011 |
| JP | 2012-58315 A | 3/2012 |
| JP | 2014-59561 A | 4/2014 |
| KR | 10-2014-0035810 A | 3/2014 |
| KR | 10-2014-0035829 A | 3/2014 |
| TW | 201344237 A | 11/2013 |
| TW | I432772 B | 4/2014 |
| TW | 201418759 A | 5/2014 |
| TW | 201418764 A | 5/2014 |
| TW | 201447360 A | 12/2014 |
| TW | 201504666 A | 2/2015 |

OTHER PUBLICATIONS

Chinese Office Action dated Apr. 6, 2017 in corresponding Chinese Patent Application No. 201510192607.9 (19 pages with English translation).

Korean Office Action dated Jan. 1, 2016 in corresponding Korean Application No. 10-2014-0137760 (13 pages in Korean with English translation).

Korean Office Action dated Jul. 19, 2016 in corresponding Korean Patent Application No. 10-2014-0137760. (9 pages in Korean with English translation).

Taiwanese Office Action dated Jan. 26, 2017 in corresponding Taiwanese Patent Application No. 104109868 (28 pages with English translation).

Taiwanese Office Action dated Oct. 6, 2017 in corresponding Taiwanese Patent Application No. 104109868 (9 pages in English, 8 pages in Taiwanese).

* cited by examiner

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.611 | 0.430 | 1.544 | 56.1 | FIRST LENS |
| 3 | 2.678 | 0.100 | | | |
| 4 | 2.497 | 0.440 | 1.544 | 56.1 | SECOND LENS |
| 5 | -67.91 | 0.000 | | | |
| 6 | INFINITY | 0.100 | STOP | | STOP |
| 7 | 13.56 | 0.250 | 1.639 | 23.2 | THIRD LENS |
| 8 | 2.651 | 0.310 | | | |
| 9 | 40.66 | 0.300 | 1.639 | 23.2 | FOURTH LENS |
| 10 | -20.50 | 0.342 | | | |
| 11 | -12.50 | 0.415 | 1.639 | 23.2 | FIFTH LENS |
| 12 | -17.59 | 0.100 | | | |
| 13 | 1.908 | 0.640 | 1.534 | 55.7 | SIXTH LENS |
| 14 | 1.350 | 0.163 | | | |
| 15 | INFINITY | 0.210 | 1.517 | 64.2 | IR FILTER |
| 16 | INFINITY | 0.765 | | | |
| IMAGE | INFINITY | 0.005 | | | IMAGE-SENSING SURFACE |

FIG. 3

| FIRST EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.611 | 2.678 | 2.497 | -67.914 | 13.562 | 2.651 | 40.659 | -20.495 | -12.499 | -17.594 | 1.908 | 1.350 |
| CONIC CONSTANT (K) | -0.245 | 0.000 | 0.000 | 0.000 | 0.000 | 1.884 | 0.000 | 0.000 | 0.000 | 0.000 | -0.592 | -6.046 |
| 4-TH ORDER COEFFICIENT (A) | -0.027 | -0.139 | -0.135 | -0.127 | -0.143 | -0.083 | -0.094 | -0.026 | 0.300 | 0.208 | -0.359 | -0.136 |
| 6-TH ORDER COEFFICIENT (B) | 0.012 | 0.030 | 0.058 | 0.157 | 0.323 | 0.171 | -0.091 | -0.344 | -0.748 | -0.440 | 0.145 | 0.057 |
| 8-TH ORDER COEFFICIENT (C) | -0.141 | -0.002 | -0.064 | 0.029 | -0.194 | 0.262 | 0.338 | 0.773 | 0.792 | 0.398 | -0.028 | -0.017 |
| 10-TH ORDER COEFFICIENT (D) | 0.360 | 0.303 | 0.609 | -0.789 | -1.050 | -1.873 | 0.143 | -0.651 | -0.478 | -0.209 | 0.002 | 0.003 |
| 12-TH ORDER COEFFICIENT (E) | -0.531 | -0.622 | -1.188 | 1.347 | 2.311 | 3.561 | -1.229 | 0.254 | 0.156 | 0.064 | 0.000 | 0.000 |
| 14-TH ORDER COEFFICIENT (F) | 0.410 | 0.587 | 1.042 | -0.934 | -1.738 | -3.085 | 1.371 | -0.041 | -0.021 | -0.011 | 0.000 | 0.000 |
| 16-TH ORDER COEFFICIENT (G) | -0.125 | -0.214 | -0.374 | 0.228 | 0.463 | 1.115 | -0.536 | -0.001 | 0.000 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 4

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.629 | 0.430 | 1.544 | 56.1 | FIRST LENS |
| 3 | 2.699 | 0.100 | | | |
| 4 | 2.496 | 0.440 | 1.544 | 56.1 | SECOND LENS |
| 5 | -106.8 | 0.000 | | | |
| 6 | INFINITY | 0.100 | STOP | | STOP |
| 7 | 18.84 | 0.250 | 1.639 | 23.2 | THIRD LENS |
| 8 | 2.811 | 0.335 | | | |
| 9 | 30.00 | 0.300 | 1.639 | 23.2 | FOURTH LENS |
| 10 | -25.42 | 0.361 | | | |
| 11 | -18.04 | 0.415 | 1.639 | 23.2 | FIFTH LENS |
| 12 | -25.78 | 0.100 | | | |
| 13 | 1.889 | 0.640 | 1.534 | 55.7 | SIXTH LENS |
| 14 | 1.356 | 0.172 | | | |
| 15 | INFINITY | 0.210 | 1.517 | 64.2 | IR FILTER |
| 16 | INFINITY | 0.766 | | | |
| IMAGE | INFINITY | 0.005 | | | IMAGE-SENSING SURFACE |

FIG. 7

| FIRST EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.629 | 2.699 | 2.496 | -106.76 | 18.841 | 2.811 | 30.000 | -25.420 | -18.040 | -25.778 | 1.889 | 1.356 |
| CONIC CONSTANT (K) | -0.215 | 0.000 | 0.000 | 0.000 | 0.000 | 1.856 | 0.000 | 0.000 | 0.000 | 0.000 | -0.608 | -5.098 |
| 4-TH ORDER COEFFICIENT (A) | -0.026 | -0.142 | -0.136 | -0.110 | -0.121 | -0.065 | -0.086 | -0.029 | 0.277 | 0.213 | -0.322 | -0.146 |
| 6-TH ORDER COEFFICIENT (B) | 0.007 | 0.019 | 0.035 | 0.047 | 0.175 | 0.091 | -0.069 | -0.312 | -0.687 | -0.460 | 0.088 | 0.064 |
| 8-TH ORDER COEFFICIENT (C) | -0.119 | 0.014 | -0.028 | 0.271 | 0.114 | 0.367 | 0.258 | 0.765 | 0.731 | 0.423 | 0.006 | -0.021 |
| 10-TH ORDER COEFFICIENT (D) | 0.324 | 0.378 | 0.666 | -0.981 | -1.253 | -1.830 | 0.085 | -0.817 | -0.451 | -0.227 | -0.007 | 0.004 |
| 12-TH ORDER COEFFICIENT (E) | -0.495 | -0.848 | -1.398 | 1.298 | 2.202 | 3.318 | -0.873 | 0.526 | 0.150 | 0.071 | 0.001 | 0.000 |
| 14-TH ORDER COEFFICIENT (F) | 0.395 | 0.839 | 1.288 | -0.761 | -1.554 | -2.834 | 0.991 | -0.206 | -0.021 | -0.012 | 0.000 | 0.000 |
| 16-TH ORDER COEFFICIENT (G) | -0.124 | -0.320 | -0.483 | 0.145 | 0.404 | 1.004 | -0.393 | 0.035 | 0.000 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 8

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.650 | 0.430 | 1.544 | 56.1 | FIRST LENS |
| 3 | 2.726 | 0.100 | | | |
| 4 | 2.494 | 0.440 | 1.544 | 56.1 | SECOND LENS |
| 5 | -80.87 | 0.000 | | | |
| 6 | INFINITY | 0.100 | STOP | | STOP |
| 7 | 21.12 | 0.262 | 1.639 | 23.2 | THIRD LENS |
| 8 | 2.756 | 0.329 | | | |
| 9 | 20.00 | 0.310 | 1.639 | 23.2 | FOURTH LENS |
| 10 | -46.91 | 0.356 | | | |
| 11 | -25.28 | 0.440 | 1.639 | 23.2 | FIFTH LENS |
| 12 | -40.67 | 0.100 | | | |
| 13 | 1.858 | 0.657 | 1.534 | 55.7 | SIXTH LENS |
| 14 | 1.375 | 0.179 | | | |
| 15 | INFINITY | 0.210 | 1.517 | 64.2 | IR FILTER |
| 16 | INFINITY | 0.765 | | | |
| IMAGE | INFINITY | 0.005 | | | IMAGE-SENSING SURFACE |

FIG. 11

| THIRD EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.650 | 2.726 | 2.494 | -80.874 | 21.125 | 2.756 | 20.000 | -46.914 | -25.282 | -40.669 | 1.858 | 1.375 |
| CONIC CONSTANT (K) | -0.197 | 0.000 | 0.000 | 0.000 | 0.000 | 1.707 | 0.000 | 0.000 | 0.000 | 0.000 | -0.621 | -4.807 |
| 4-TH ORDER COEFFICIENT (A) | -0.026 | -0.144 | -0.138 | -0.107 | -0.117 | -0.064 | -0.082 | -0.022 | 0.266 | 0.191 | -0.303 | -0.140 |
| 6-TH ORDER COEFFICIENT (B) | 0.006 | 0.033 | 0.043 | 0.050 | 0.173 | 0.100 | -0.078 | -0.315 | -0.633 | -0.406 | 0.064 | 0.060 |
| 8-TH ORDER COEFFICIENT (C) | -0.104 | -0.014 | -0.052 | 0.181 | 0.008 | 0.247 | 0.337 | 0.772 | 0.679 | 0.374 | 0.020 | -0.020 |
| 10-TH ORDER COEFFICIENT (D) | 0.282 | 0.422 | 0.700 | -0.646 | -0.807 | -1.381 | -0.243 | -0.886 | -0.440 | -0.206 | -0.012 | 0.004 |
| 12-TH ORDER COEFFICIENT (E) | -0.434 | -0.899 | -1.430 | 0.768 | 1.459 | 2.536 | -0.278 | 0.626 | 0.158 | 0.067 | 0.002 | 0.000 |
| 14-TH ORDER COEFFICIENT (F) | 0.351 | 0.879 | 1.314 | -0.354 | -0.989 | -2.161 | 0.492 | -0.260 | -0.025 | -0.012 | 0.000 | 0.000 |
| 16-TH ORDER COEFFICIENT (G) | -0.112 | -0.336 | -0.492 | 0.020 | 0.238 | 0.764 | -0.225 | 0.046 | 0.001 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 12

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.719 | 0.430 | 1.544 | 56.1 | FIRST LENS |
| 3 | 2.998 | 0.100 | | | |
| 4 | 2.715 | 0.440 | 1.544 | 56.1 | SECOND LENS |
| 5 | -17.11 | 0.000 | | | |
| 6 | INFINITY | 0.100 | STOP | | STOP |
| 7 | 31.02 | 0.325 | 1.639 | 23.2 | THIRD LENS |
| 8 | 2.605 | 0.335 | | | |
| 9 | 21.92 | 0.388 | 1.639 | 23.2 | FOURTH LENS |
| 10 | -56.57 | 0.388 | | | |
| 11 | -46.69 | 0.470 | 1.639 | 23.2 | FIFTH LENS |
| 12 | -486.36 | 0.100 | | | |
| 13 | 1.727 | 0.627 | 1.534 | 55.7 | SIXTH LENS |
| 14 | 1.291 | 0.185 | | | |
| 15 | INFINITY | 0.210 | 1.517 | 64.2 | IR FILTER |
| 16 | INFINITY | 0.767 | | | |
| IMAGE | INFINITY | 0.005 | | | IMAGE-SENSING SURFACE |

FIG. 15

| FOURTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.719 | 2.998 | 2.715 | -17.107 | 31.020 | 2.605 | 21.921 | -56.569 | -46.692 | -486.36 | 1.727 | 1.291 |
| CONIC CONSTANT (K) | -0.196 | 0.000 | 0.000 | 0.000 | 0.000 | 1.434 | 0.000 | 0.000 | 0.000 | 0.000 | -0.686 | -4.713 |
| 4-TH ORDER COEFFICIENT (A) | -0.024 | -0.130 | -0.130 | -0.102 | -0.102 | -0.056 | -0.062 | -0.003 | 0.259 | 0.186 | -0.318 | -0.148 |
| 6-TH ORDER COEFFICIENT (B) | 0.003 | 0.007 | 0.001 | 0.007 | 0.105 | 0.057 | -0.120 | -0.310 | -0.584 | -0.384 | 0.073 | 0.063 |
| 8-TH ORDER COEFFICIENT (C) | -0.096 | 0.006 | 0.027 | 0.251 | 0.118 | 0.250 | 0.454 | 0.701 | 0.593 | 0.340 | 0.017 | -0.020 |
| 10-TH ORDER COEFFICIENT (D) | 0.249 | 0.423 | 0.544 | -0.546 | -0.654 | -1.031 | -0.624 | -0.815 | -0.368 | -0.182 | -0.011 | 0.004 |
| 12-TH ORDER COEFFICIENT (E) | -0.365 | -0.869 | -1.119 | 0.443 | 0.860 | 1.672 | 0.378 | 0.582 | 0.126 | 0.058 | 0.002 | 0.000 |
| 14-TH ORDER COEFFICIENT (F) | 0.287 | 0.793 | 0.956 | -0.091 | -0.424 | -1.300 | -0.048 | -0.233 | -0.018 | -0.010 | 0.000 | 0.000 |
| 16-TH ORDER COEFFICIENT (G) | -0.091 | -0.287 | -0.330 | -0.040 | 0.060 | 0.426 | -0.042 | 0.038 | 0.000 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 16

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.730 | 0.442 | 1.544 | 56.1 | FIRST LENS |
| 3 | 3.136 | 0.100 | | | |
| 4 | 2.707 | 0.447 | 1.544 | 56.1 | SECOND LENS |
| 5 | -20.01 | 0.000 | | | |
| 6 | INFINITY | 0.100 | STOP | | STOP |
| 7 | 38.08 | 0.311 | 1.639 | 23.2 | THIRD LENS |
| 8 | 2.692 | 0.335 | | | |
| 9 | 17.40 | 0.439 | 1.639 | 23.2 | FOURTH LENS |
| 10 | -300.0 | 0.385 | | | |
| 11 | -4.968 | 0.450 | 1.639 | 23.2 | FIFTH LENS |
| 12 | -7.596 | 0.100 | | | |
| 13 | 1.685 | 0.670 | 1.534 | 55.7 | SIXTH LENS |
| 14 | 1.323 | 0.209 | | | |
| 15 | INFINITY | 0.210 | 1.517 | 64.2 | IR FILTER |
| 16 | INFINITY | 0.767 | | | |
| IMAGE | INFINITY | 0.003 | | | IMAGE-SENSING SURFACE |

FIG. 19

| FIFTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.730 | 3.136 | 2.707 | -20.014 | 38.081 | 2.692 | 17.401 | -300.00 | -4.968 | -7.596 | 1.685 | 1.323 |
| CONIC CONSTANT (K) | -0.179 | 0.000 | 0.000 | 0.000 | 0.000 | 1.478 | 0.000 | 0.000 | 0.000 | 0.000 | -0.707 | -4.960 |
| 4-TH ORDER COEFFICIENT (A) | -0.022 | -0.124 | -0.126 | -0.104 | -0.099 | -0.054 | -0.055 | 0.015 | 0.290 | 0.134 | -0.337 | -0.122 |
| 6-TH ORDER COEFFICIENT (B) | 0.009 | 0.020 | 0.009 | 0.004 | 0.091 | 0.051 | -0.128 | -0.282 | -0.649 | -0.299 | 0.132 | 0.051 |
| 8-TH ORDER COEFFICIENT (C) | -0.115 | -0.068 | -0.019 | 0.273 | 0.219 | 0.258 | 0.418 | 0.543 | 0.663 | 0.257 | -0.029 | -0.015 |
| 10-TH ORDER COEFFICIENT (D) | 0.279 | 0.565 | 0.623 | -0.544 | -0.859 | -0.988 | -0.562 | -0.556 | -0.446 | -0.137 | 0.004 | 0.003 |
| 12-TH ORDER COEFFICIENT (E) | -0.384 | -1.033 | -1.204 | 0.354 | 1.041 | 1.508 | 0.345 | 0.359 | 0.182 | 0.045 | 0.000 | 0.000 |
| 14-TH ORDER COEFFICIENT (F) | 0.278 | 0.868 | 0.989 | 0.031 | -0.477 | -1.104 | -0.059 | -0.131 | -0.038 | -0.008 | 0.000 | 0.000 |
| 16-TH ORDER COEFFICIENT (G) | -0.081 | -0.286 | -0.317 | -0.082 | 0.054 | 0.343 | -0.029 | 0.020 | 0.003 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 20

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.728 | 0.436 | 1.544 | 56.1 | FIRST LENS |
| 3 | 3.173 | 0.100 | | | |
| 4 | 2.677 | 0.441 | 1.544 | 56.1 | SECOND LENS |
| 5 | -18.64 | 0.000 | | | |
| 6 | INFINITY | 0.100 | STOP | | STOP |
| 7 | 39.88 | 0.321 | 1.639 | 23.2 | THIRD LENS |
| 8 | 2.580 | 0.333 | | | |
| 9 | 19.33 | 0.473 | 1.639 | 23.2 | FOURTH LENS |
| 10 | -150.1 | 0.407 | | | |
| 11 | -6.370 | 0.449 | 1.639 | 23.2 | FIFTH LENS |
| 12 | -8.551 | 0.100 | | | |
| 13 | 1.744 | 0.637 | 1.534 | 55.7 | SIXTH LENS |
| 14 | 1.289 | 0.192 | | | |
| 15 | INFINITY | 0.210 | 1.517 | 64.2 | IR FILTER |
| 16 | INFINITY | 0.768 | | | |
| IMAGE | INFINITY | 0.002 | | | IMAGE-SENSING SURFACE |

FIG. 23

| SIXTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.728 | 3.173 | 2.677 | -18.636 | 39.883 | 2.580 | 19.334 | -150.1 | -6.370 | -150.1 | 1.744 | 1.289 |
| CONIC CONSTANT (K) | -0.180 | 0.000 | 0.000 | 0.000 | 0.000 | 1.486 | 0.000 | 0.000 | 0.000 | 0.000 | -0.687 | -5.284 |
| 4-TH ORDER COEFFICIENT (A) | -0.021 | -0.123 | -0.126 | -0.103 | -0.098 | -0.055 | -0.055 | 0.010 | 0.285 | 0.158 | -0.355 | -0.138 |
| 6-TH ORDER COEFFICIENT (B) | 0.004 | 0.013 | 0.000 | -0.007 | 0.082 | 0.052 | -0.117 | -0.258 | -0.631 | -0.318 | 0.155 | 0.061 |
| 8-TH ORDER COEFFICIENT (C) | -0.095 | -0.011 | 0.044 | 0.330 | 0.267 | 0.252 | 0.379 | 0.488 | 0.635 | 0.254 | -0.040 | -0.018 |
| 10-TH ORDER COEFFICIENT (D) | 0.239 | 0.409 | 0.446 | -0.702 | -0.987 | -0.952 | -0.487 | -0.489 | -0.440 | -0.129 | 0.006 | 0.003 |
| 12-TH ORDER COEFFICIENT (E) | -0.345 | -0.823 | -0.955 | 0.604 | 1.234 | 1.436 | 0.262 | 0.315 | 0.196 | 0.042 | -0.001 | 0.000 |
| 14-TH ORDER COEFFICIENT (F) | 0.261 | 0.731 | 0.818 | -0.165 | -0.628 | -1.036 | -0.008 | -0.117 | -0.047 | -0.008 | 0.000 | 0.000 |
| 16-TH ORDER COEFFICIENT (G) | -0.079 | -0.251 | -0.271 | -0.023 | 0.098 | 0.317 | -0.043 | 0.018 | 0.004 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 24

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.725 | 0.431 | 1.544 | 56.1 | FIRST LENS |
| 3 | 3.065 | 0.100 | | | |
| 4 | 2.582 | 0.445 | 1.544 | 56.1 | SECOND LENS |
| 5 | -18.06 | 0.000 | | | |
| 6 | INFINITY | 0.100 | STOP | | STOP |
| 7 | 36.11 | 0.323 | 1.639 | 23.2 | THIRD LENS |
| 8 | 2.509 | 0.316 | | | |
| 9 | 20.22 | 0.555 | 1.639 | 23.2 | FOURTH LENS |
| 10 | -300.0 | 0.422 | | | |
| 11 | -11.65 | 0.433 | 1.639 | 23.2 | FIFTH LENS |
| 12 | -12.88 | 0.100 | | | |
| 13 | 1.790 | 0.585 | 1.534 | 55.7 | SIXTH LENS |
| 14 | 1.253 | 0.180 | | | |
| 15 | INFINITY | 0.210 | 1.517 | 64.2 | IR FILTER |
| 16 | INFINITY | 0.767 | | | |
| IMAGE | INFINITY | 0.003 | | | IMAGE-SENSING SURFACE |

FIG. 27

| SEVENTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.725 | 3.065 | 2.582 | -18.061 | 36.114 | 2.509 | 20.224 | -300.00 | -11.649 | -12.885 | 1.790 | 1.253 |
| CONIC CONSTANT (K) | -0.182 | 0.000 | 0.000 | 0.000 | 0.000 | 1.599 | 0.000 | 0.000 | 0.000 | 0.000 | -0.677 | -5.492 |
| 4-TH ORDER COEFFICIENT (A) | -0.021 | -0.122 | -0.126 | -0.104 | -0.100 | -0.062 | -0.061 | -0.010 | 0.254 | 0.175 | -0.371 | -0.154 |
| 6-TH ORDER COEFFICIENT (B) | 0.004 | 0.002 | -0.007 | -0.005 | 0.103 | 0.076 | -0.088 | -0.201 | -0.582 | -0.346 | 0.171 | 0.072 |
| 8-TH ORDER COEFFICIENT (C) | -0.099 | 0.015 | 0.039 | 0.338 | 0.243 | 0.234 | 0.393 | 0.411 | 0.575 | 0.271 | -0.045 | -0.021 |
| 10-TH ORDER COEFFICIENT (D) | 0.252 | 0.371 | 0.500 | -0.730 | -1.005 | -1.001 | -0.673 | -0.432 | -0.398 | -0.135 | 0.007 | 0.004 |
| 12-TH ORDER COEFFICIENT (E) | -0.362 | -0.796 | -1.071 | 0.643 | 1.327 | 1.586 | 0.622 | 0.293 | 0.179 | 0.044 | -0.001 | 0.000 |
| 14-TH ORDER COEFFICIENT (F) | 0.273 | 0.732 | 0.943 | -0.173 | -0.723 | -1.186 | -0.313 | -0.114 | -0.043 | -0.008 | 0.000 | 0.000 |
| 16-TH ORDER COEFFICIENT (G) | -0.083 | -0.260 | -0.323 | -0.035 | 0.125 | 0.371 | 0.057 | 0.018 | 0.004 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 28

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.646 | 0.430 | 1.544 | 56.1 | FIRST LENS |
| 3 | 2.809 | 0.102 | | | |
| 4 | 2.527 | 0.440 | 1.544 | 56.1 | SECOND LENS |
| 5 | -29.39 | 0.000 | | | |
| 6 | INFINITY | 0.100 | STOP | | STOP |
| 7 | 30.00 | 0.250 | 1.639 | 23.2 | THIRD LENS |
| 8 | 2.642 | 0.346 | | | |
| 9 | 30.00 | 0.300 | 1.639 | 23.2 | FOURTH LENS |
| 10 | -25.4 | 0.423 | | | |
| 11 | -13.44 | 0.415 | 1.639 | 23.2 | FIFTH LENS |
| 12 | -7.56 | 0.147 | | | |
| 13 | 2.143 | 0.640 | 1.534 | 55.7 | SIXTH LENS |
| 14 | 1.266 | 0.211 | | | |
| 15 | INFINITY | 0.210 | 1.517 | 64.2 | IR FILTER |
| 16 | INFINITY | 0.677 | | | |
| IMAGE | INFINITY | 0.004 | | | IMAGE-SENSING SURFACE |

FIG. 31

| EIGHTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.646 | 2.809 | 2.527 | -29.394 | 30.000 | 2.642 | 30.000 | -25.420 | -13.441 | -7.557 | 2.143 | 1.266 |
| CONIC CONSTANT (K) | -0.212 | 0.000 | 0.000 | 0.000 | 0.000 | 1.744 | 0.000 | 0.000 | 0.000 | 0.000 | -0.554 | -5.208 |
| 4-TH ORDER COEFFICIENT (A) | -0.025 | -0.144 | -0.139 | -0.108 | -0.123 | -0.068 | -0.081 | -0.036 | 0.235 | 0.222 | -0.266 | -0.119 |
| 6-TH ORDER COEFFICIENT (B) | 0.004 | 0.039 | 0.039 | 0.041 | 0.183 | 0.092 | -0.108 | -0.263 | -0.558 | -0.432 | 0.060 | 0.049 |
| 8-TH ORDER COEFFICIENT (C) | -0.097 | -0.044 | -0.019 | 0.266 | 0.074 | 0.371 | 0.451 | 0.706 | 0.563 | 0.375 | 0.011 | -0.015 |
| 10-TH ORDER COEFFICIENT (D) | 0.244 | 0.482 | 0.609 | -0.930 | -1.167 | -1.854 | -0.474 | -0.847 | -0.336 | -0.195 | -0.007 | 0.003 |
| 12-TH ORDER COEFFICIENT (E) | -0.356 | -0.928 | -1.254 | 1.222 | 2.150 | 3.408 | -0.028 | 0.621 | 0.110 | 0.060 | 0.001 | 0.000 |
| 14-TH ORDER COEFFICIENT (F) | 0.277 | 0.830 | 1.107 | -0.725 | -1.599 | -2.932 | 0.361 | -0.265 | -0.015 | -0.010 | 0.000 | 0.000 |
| 16-TH ORDER COEFFICIENT (G) | -0.086 | -0.294 | -0.395 | 0.148 | 0.448 | 1.032 | -0.202 | 0.047 | 0.000 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 32

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.637 | 0.430 | 1.544 | 56.1 | FIRST LENS |
| 3 | 2.863 | 0.102 | | | |
| 4 | 2.554 | 0.440 | 1.544 | 56.1 | SECOND LENS |
| 5 | -52.76 | 0.000 | | | |
| 6 | INFINITY | 0.100 | | | STOP |
| 7 | 30.00 | 0.250 | 1.639 | 23.2 | THIRD LENS |
| 8 | 2.584 | 0.334 | | | |
| 9 | 30.00 | 0.300 | 1.639 | 23.2 | FOURTH LENS |
| 10 | -25.4 | 0.337 | | | |
| 11 | -17.58 | 0.415 | 1.639 | 23.2 | FIFTH LENS |
| 12 | -2831.83 | 0.100 | | | |
| 13 | 1.681 | 0.640 | 1.534 | 55.7 | SIXTH LENS |
| 14 | 1.462 | 0.171 | | | |
| 15 | INFINITY | 0.210 | 1.517 | 64.2 | IR FILTER |
| 16 | INFINITY | 0.890 | | | |
| IMAGE | INFINITY | 0.005 0.005 | | | IMAGE-SENSING SURFACE |

FIG. 35

| NINTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.637 | 2.863 | 2.554 | -52.760 | 30.000 | 2.584 | 30.000 | -25.420 | -17.578 | -2831.8 | 1.681 | 1.462 |
| CONIC CONSTANT (K) | -0.201 | 0.000 | 0.000 | 0.000 | 0.000 | 1.763 | 0.000 | 0.000 | 0.000 | 0.000 | -0.666 | -4.153 |
| 4-TH ORDER COEFFICIENT (A) | -0.026 | -0.143 | -0.139 | -0.108 | -0.121 | -0.070 | -0.084 | -0.015 | 0.292 | 0.178 | -7.715 | -5.369 |
| 6-TH ORDER COEFFICIENT (B) | 0.016 | 0.031 | 0.040 | 0.046 | 0.169 | 0.104 | -0.084 | -0.377 | -0.742 | -0.440 | 8.163 | 13.713 |
| 8-TH ORDER COEFFICIENT (C) | -0.153 | -0.051 | -0.082 | 0.238 | 0.152 | 0.354 | 0.343 | 0.929 | 0.850 | 0.433 | 10.739 | -26.459 |
| 10-TH ORDER COEFFICIENT (D) | 0.381 | 0.591 | 0.917 | -0.821 | -1.398 | -1.864 | -0.117 | -1.061 | -0.578 | -0.248 | -32.327 | 31.958 |
| 12-TH ORDER COEFFICIENT (E) | -0.538 | -1.192 | -1.892 | 0.965 | 2.476 | 3.440 | -0.625 | 0.727 | 0.221 | 0.082 | 27.350 | -19.954 |
| 14-TH ORDER COEFFICIENT (F) | 0.403 | 1.103 | 1.731 | -0.426 | -1.781 | -2.943 | 0.841 | -0.288 | -0.041 | -0.015 | -8.111 | 4.877 |
| 16-TH ORDER COEFFICIENT (G) | -0.121 | -0.397 | -0.632 | 0.013 | 0.467 | 1.030 | -0.354 | 0.048 | 0.002 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 36

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | INFINITY | INFINITY | | | |
| 1 | INFINITY | 0.030 | | | |
| 2 | 1.637 | 0.430 | 1.544 | 56.1 | FIRST LENS |
| 3 | 2.863 | 0.105 | | | |
| 4 | 2.554 | 0.440 | 1.544 | 56.1 | SECOND LENS |
| 5 | -52.76 | 0.000 | | | |
| 6 | INFINITY | 0.100 | | | STOP |
| 7 | 30.00 | 0.250 | 1.639 | 23.2 | THIRD LENS |
| 8 | 2.584 | 0.328 | | | |
| 9 | 30.00 | 0.300 | 1.639 | 23.2 | FOURTH LENS |
| 10 | -25.4 | 0.341 | | | |
| 11 | -17.58 | 0.415 | 1.639 | 23.2 | FIFTH LENS |
| 12 | -2831.83 | 0.100 | | | |
| 13 | 1.681 | 0.640 | 1.534 | 55.7 | SIXTH LENS |
| 14 | 1.462 | 0.172 | | | |
| 15 | INFINITY | 0.210 | 1.517 | 64.2 | IR FILTER |
| 16 | INFINITY | 0.940 | | | |
| IMAGE | INFINITY | 0.005 | | | IMAGE-SENSING SURFACE |

FIG. 39

| TENTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.639 | 3.110 | 2.664 | -134.18 | 30.000 | 2.488 | 30.000 | -25.420 | -14.184 | -62.102 | 1.706 | 1.531 |
| CONIC CONSTANT (K) | -0.187 | 0.000 | 0.000 | 0.000 | 0.000 | 1.654 | 0.000 | 0.000 | 0.000 | 0.000 | -0.647 | -4.240 |
| 4-TH ORDER COEFFICIENT (A) | -0.026 | -0.148 | -0.146 | -0.108 | -0.116 | -0.067 | -0.086 | -0.022 | 0.273 | 0.160 | -0.297 | -0.144 |
| 6-TH ORDER COEFFICIENT (B) | 0.018 | 0.077 | 0.099 | 0.082 | 0.166 | 0.091 | -0.042 | -0.339 | -0.700 | -0.413 | 0.058 | 0.058 |
| 8-TH ORDER COEFFICIENT (C) | -0.149 | -0.201 | -0.295 | -0.018 | -0.021 | 0.302 | 0.145 | 0.844 | 0.801 | 0.408 | 0.019 | -0.017 |
| 10-TH ORDER COEFFICIENT (D) | 0.348 | 0.855 | 1.375 | -0.107 | -0.761 | -1.627 | 0.336 | -0.972 | -0.543 | -0.232 | -0.010 | 0.003 |
| 12-TH ORDER COEFFICIENT (E) | -0.474 | -1.457 | -2.455 | 0.005 | 1.533 | 3.104 | -1.218 | 0.683 | 0.208 | 0.076 | 0.002 | 0.000 |
| 14-TH ORDER COEFFICIENT (F) | 0.349 | 1.228 | 2.093 | 0.210 | -1.134 | -2.735 | 1.274 | -0.281 | -0.039 | -0.014 | 0.000 | 0.000 |
| 16-TH ORDER COEFFICIENT (G) | -0.103 | -0.413 | -0.725 | -0.155 | 0.293 | 0.980 | -0.491 | 0.049 | 0.003 | 0.001 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 40

HIGH RESOLUTION LENS MODULE

CROSS-REFERENCE TO RELATED APPLICATIONS

This application is a continuation of U.S. patent application Ser. No. 16/152,452 filed on Oct. 5, 2018, now U.S. Pat. No. 10,545,317 issued on Jan. 28, 2020, which is a continuation of U.S. patent application Ser. No. 14/664,111 filed on Mar. 20, 2015, now U.S. Pat. No. 10,133,030 issued on Nov. 20, 2018, which claims the benefit under 35 USC 119 (a) of Korean Patent Application Nos. 10-2014-0073657 filed on Jun. 17, 2014, and 10-2014-0137760 filed on Oct. 13, 2014, in the Korean Intellectual Property Office, the entire disclosures of which are incorporated herein by reference for all purposes.

BACKGROUND

Some embodiments of the present disclosure may relate to a lens module having an optical system including six or more lenses.

Lens modules, mounted in camera devices provided in portable terminals, commonly include a plurality of lenses. For example, such a lens module may include six lenses, in order to provide an optical system having high resolution.

However, in the case that such an optical system having high resolution is configured using a plurality of lenses, as described above, a focal length (the distance from an object-side surface of a first lens to an image-sensing surface) of the optical system may be increased. In this case, it may be difficult to mount the lens module in a relatively thin device or portable terminal. Therefore, the development of a lens module in which a length of the optical system is reduced may be needed.

Patent Documents 1 to 4 listed below relate to art associated with the lens module.

RELATED ART DOCUMENT (Patent Document 1) U.S. Pat. No. 8,477,431 (Patent Document 2) U.S. Patent Application Publication No. 2012/0188654

(Patent Document 3) Japanese Patent Laid-Open Publication No. 2011-085733

(Patent Document 4) U.S. Patent Application Publication No. 2012/0194726

SUMMARY

Some exemplary embodiments in the present disclosure may provide a lens module having high resolution.

According to an aspect of the present disclosure, a lens module may include: a first lens having refractive power and a convex object-side surface; a second lens having refractive power and a convex object-side surface; a third lens having refractive power and a convex object-side surface; a fourth lens having refractive power, both surfaces of the fourth lens being convex; a fifth lens having refractive power and a convex image-side surface; and a sixth lens having refractive power and a concave image-sided surface. One or more inflection points may be formed on the image-sided surface of the sixth lens.

According to another aspect of the present disclosure, a lens module may include: a first lens having positive refractive power; a second lens having positive refractive power; a third lens having refractive power and a convex image-side surface; a fourth lens having refractive power; a fifth lens having negative refractive power; and a sixth lens having refractive power. One or more inflection points may be formed on an image-side surface of the sixth lens.

Other embodiments are also described. The above summary does not include an exhaustive list of all aspects of the present invention. It is contemplated that the invention includes all lens modules that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF DRAWINGS

The above and other aspects, features and other advantages of the present disclosure will be more clearly understood from the following detailed description taken in conjunction with the accompanying drawings, in which:

FIG. 3 is a table illustrating characteristics of lenses illustrated in FIG. 1;

FIG. 4 is a table illustrating aspherical surface coefficients of the lens module illustrated in FIG. 1;

FIG. 7 is a table illustrating characteristics of lenses illustrated in FIG. 5;

FIG. 8 is a table illustrating aspherical surface coefficients of the lens module illustrated in FIG. 5;

FIG. 11 is a table illustrating characteristics of lenses illustrated in FIG. 9;

FIG. 12 is a table illustrating aspherical surface coefficients of the lens module illustrated in FIG. 9;

FIG. 15 is a table illustrating characteristics of lenses illustrated in FIG. 13;

FIG. 16 is a table illustrating aspherical surface coefficients of the lens module illustrated in FIG. 13;

FIG. 19 is a table illustrating characteristics of lenses illustrated in FIG. 17;

FIG. 20 is a table illustrating aspherical surface coefficients of the lens module illustrated in FIG. 17;

FIG. 23 is a table illustrating characteristics of lenses illustrated in FIG. 21;

FIG. 24 is a table illustrating aspherical surface coefficients of the lens module illustrated in FIG. 21;

FIG. 27 is a table illustrating characteristics of lenses illustrated in FIG. 25;

FIG. 28 is a table illustrating aspherical surface coefficients of the lens module illustrated in FIG. 25;

FIG. 31 is a table illustrating characteristics of lenses illustrated in FIG. 29;

FIG. 32 is a table illustrating aspherical surface coefficients of the lens module illustrated in FIG. 29;

FIG. 35 is a table illustrating characteristics of lenses illustrated in FIG. 33;

FIG. 36 is a table illustrating aspherical surface coefficients of the lens module illustrated in FIG. 33;

FIG. 39 is a table illustrating characteristics of lenses illustrated in FIG. 37; and FIG. 40 is a table illustrating aspherical surface coefficients of the lens module illustrated in FIG. 37.

DETAILED DESCRIPTION

Figure 1:
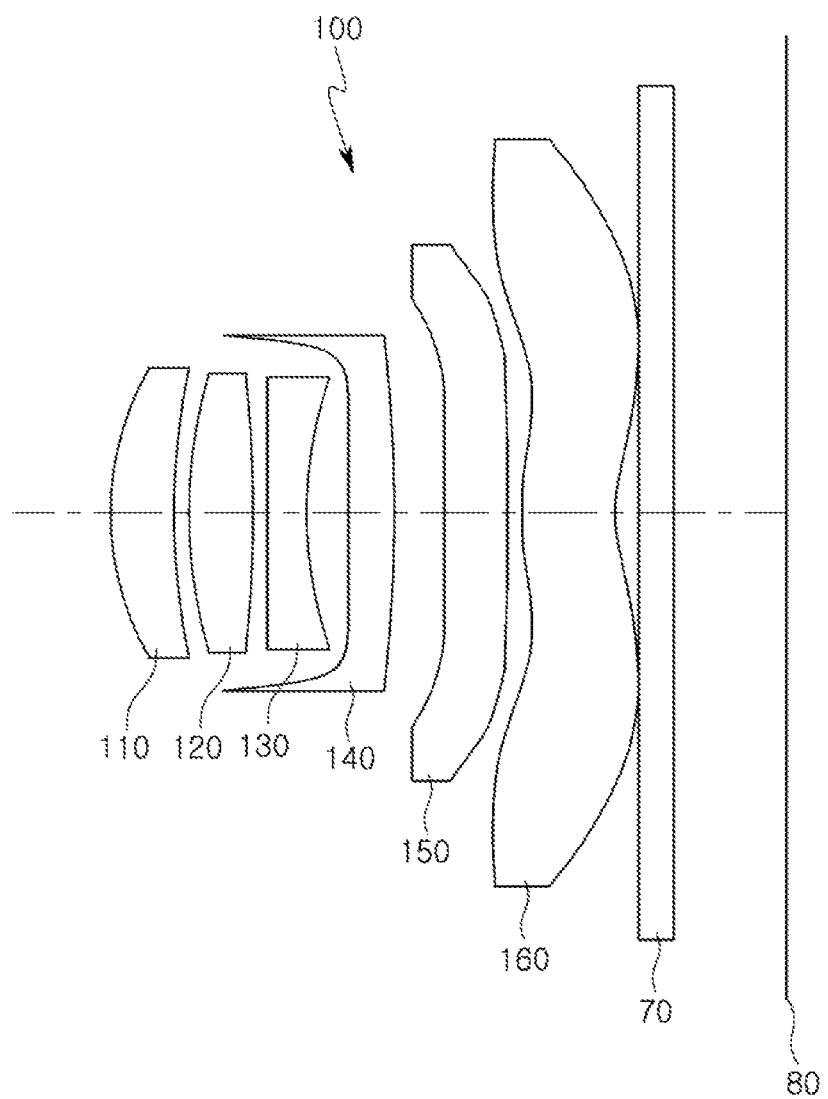
FIG. 1 is a configuration diagram of a lens module according to a first exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, in embodiments of the present specification, a first lens refers to a lens closest to an object (or a subject), and a sixth lens refers to a lens closest to an image-sensing surface (or an image sensor). Further, the term 'first lens surface' or 'first surface' refers to a lens surface oriented to or facing the object (or the subject) in the lens module, and the term 'second lens surface' or 'second surface' refers to a lens surface oriented to or facing the image-sensing surface (or the image sensor) in the lens module. In addition, unless otherwise indicated herein, in embodiments of the present specification, units of radii of curvature, thicknesses, TTLs (or OALs) (optical axis distances from a first surface of the first lens to the image-sensing surface), SLs, IMGHs (image heights), and BFLs (back focus lengths) of the lenses, an overall focal length of an optical system, and a focal length of each lens may be in millimeters (mm). In addition, unless otherwise indicated herein, thicknesses of lenses, gaps between the lenses, TTLs (or OALs), and SLs may be distances measured based on an optical axis of the lenses. Further, in descriptions of lens shapes unless otherwise indicated herein, the meaning that one lens surface is convex is that an optical axis portion of a corresponding surface is convex, and the meaning that one lens surface is concave is that an optical axis portion of a corresponding surface is concave. Therefore, although it is described that one lens surface is convex, an edge portion of the lens or a peripheral lens portion of the optical axis maybe concave. Likewise, although it is described that one lens surface is concave, an edge portion of the lens may be convex. In addition, in the following detailed description and the claims, it is to be noted that an inflection point refers to a point at which a bent is changed in a portion that does not intersect with the optical axis.

In some embodiments of the present disclosure, a lens module may include an optical system including a plurality of lenses. For example, the optical system of the lens module may include six or more lenses having refractive power. However, the lens module is not limited to six lenses. The lens module may further include other components or additional one or more lenses. For example, the lens module may include a stop for controlling an amount of light. In addition, the lens module may further include an infrared cut-off filter for removing infrared light. Additionally, the lens module may further include an image sensor (for example, an imaging device) converting an image of a subject incident through the optical system into an electrical signal. Further, the lens module may further include a gap maintaining member adjusting gaps between lenses. In addition to six lenses, one or more lenses may be arranged in front of the first lens, behind the sixth lens, or between the first and sixth lenses.

First to sixth lenses may be formed of materials having a refractive index different from that of air. For example, the first to sixth lenses maybe formed using a plastic material or glass. At least one or more of the first to sixth lenses may have an aspherical surface. For example, only the sixth lens of the first to sixth lenses may have the aspherical surface. As another example, respective at least one surfaces of all of the first to sixth lenses may be aspherical. Here, the aspherical surface of each lens may be represented by Mathematical Expression 1.

[Mathematical Expression 1]
$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Here, c is an inverse number of a radius of curvature of a corresponding lens, K is a conic constant, and r is a distance from any point on an aspherical surface to an optical axis. In addition, constants A to J refer to sequential 4-th order to 20-th order aspherical coefficients. In addition, Z indicates sag at any point on an aspherical surface positioned to be spaced apart from the optical axis by a distance r.

The optical system configuring the lens module may have an F No. of 2.3 or less. In this case, the subject may be clearly imaged. For example, the lens module according to the exemplary embodiment of the present disclosure may clearly capture an image of the subject even under conditions of low illumination (for example, 100 lux or less). However, F No. of the optical system may be greater than 2.3.

The optical system of the lens module may satisfy the following Conditional Expression.

[Conditional Expression] 1.3<f1/f<2.5

Here, f is an overall focal length [mm] of the lens module, and f1 is a focal length [mm] of the first lens. The Conditional Expression above is a numerical condition for optimizing refractive power of the first lens. For example, the first lens that is outside of the lower value limit may have relatively strong refractive power to limit optical designs of the second to fifth lenses, and the first lens that is outside of the upper value limit may have relatively weak refractive power, which may be disadvantageous in miniaturizing the lens module.

The optical system of the lens module may satisfy the following Conditional Expressions.

[Conditional Expression] 32.0<V1-V3
[Conditional Expression] 30.0<V1-V4
[Conditional Expression] 32.0<V1-V5

Here, V1 is an Abbe number of the first lens, V3 is an Abbe number of the third lens, V4 is an Abbe number of the fourth lens, and V5 is an Abbe number of the fifth lens.

The Conditional Expressions above may be conditions for facilitating an optical design of the first lens. For example, the third to fifth lenses satisfying the Conditional Expressions above may have a refractive index larger than that of the first lens, and therefore the manufacturing thereof may be performed in various forms while ensuring a degree of freedom in a design of the first lens.

The second to fifth lenses of the optical system configuring the lens module may satisfy the following Conditional Expressions.

[Conditional Expression] 0.9<f2/f
[Conditional Expression] f3/f<−0.9
[Conditional Expression] 3.0<f4/f
[Conditional Expression] f5/f<−3.0

Here, f2 is a focal length [mm] of the second lens, f3 is a focal length [mm] of the third lens, f4 is a focal length [mm] of the fourth lens, f5 is a focal length [mm] of the fifth lens, and f is the overall focal length [mm] of the lens module.

The Conditional Expressions above may provide refractive power ranges of the second to fifth lenses, in which a length of the optical system may be shortened.

The optical system of the lens module may satisfy the following Conditional Expression.

[Conditional Expression] 1.1<OAL/f

Here, OAL is a distance [mm] from an object-side surface of the first lens to the image-sensing surface, and f is the overall focal length [mm] of the lens module.

The first to third lenses of the optical system configuring the lens module may satisfy the following Conditional Expressions.

[Conditional Expression] 1.4<f1/f2<5.0
[Conditional Expression] f2/f3<0.8

Here, f1 is the focal length [mm] of the first lens, f2 is the focal length [mm] of the second lens, and f3 is the focal length [mm] of the third lens.

The Conditional Expressions above may be conditions for optimizing optical designs of the first to third lenses. For example, when the second lens is designed in a range in which all of the Conditional Expressions above are satisfied, degrees of freedom of the first and third lenses may be increased, and the first and third lenses may be variously modified or implemented.

The optical system of the lens module may satisfy the following Conditional Expressions.

[Conditional Expression] 0.25<BFL/f<0.35
[Conditional Expression] 0.02<D12/f
[Conditional Expression] 0.3<r1/f<0.8
[Conditional Expression] 2.0<r5/f Here, BFL is a distance [mm] from an image-side surface of the sixth lens to the image-sensing surface, D12 is an air gap [mm] or an optical-axis distance between the first and second lenses, r1 is a radius [mm] of curvature of the object-side surface of the first lens, r5 is a radius [mm] of curvature of an object-side surface of the third lens, and f is the overall focal length [mm] of the lens module.

The Conditional Expressions above may be conditions for optimizing sizes of BFL, D12, r1, r5 having an influence on the overall focal length of the optical system.

The optical system of the lens module may satisfy the following Conditional Expression.

[Conditional Expression] 0.1<EPD/2/f1

Here, EPD/2 is a radius [mm] of an entrance pupil having an entrance pupil diameter (EPD), and f1 is the focal length [mm] of the first lens.

The optical system of the lens module may satisfy the following Conditional Expression.

[Conditional Expression] 0.75<OAL/ImgH/2<0.85

Here, OAL is the distance [mm] from an object-side surface of the first lens to the image-sensing surface, and ImgH is a maximum height [mm] of an image that may be imaged by the lens module.

Next, the optical system configuring the lens module will hereinafter be described.

The optical system of the lens module may be manufactured in the following manner.

For example, the optical system of the lens module may include a first lens having refractive power and an object-side surface thereof being convex, a second lens having refractive power and an object-side surface thereof being convex, a third lens having refractive power and an object-side surface thereof being convex, a fourth lens having refractive power and both surfaces thereof being convex, a fifth lens having refractive power and an image-side surface thereof being convex, and a sixth lens having refractive power and an image-side surface thereof being concave. One or more inflection points may be formed on the image-side surface of the sixth lens.

As another example, the optical system of the lens module may include a first lens having positive refractive power, a second lens having positive refractive power, a third lens having refractive power and an image-side surface thereof being convex, a fourth lens having refractive power, a fifth lens having negative refractive power, and a sixth lens having refractive power. One or more inflection points may be formed on an image-side surface of the sixth lens.

As yet another example, the optical system of the lens module may include a first lens having positive refractive power, a second lens having positive refractive power, a third lens having refractive power and an image-side surface thereof being convex, a fourth lens having positive refractive power and an object-side surface thereof being convex, a fifth lens having refractive power, and a sixth lens having refractive power. One or more inflection points may be formed on an image-side surface of the sixth lens.

The lenses and an image sensor configuring the optical system will hereinafter be described.

The first lens may have refractive power. For example, the first lens may have positive refractive power. However, the first lens may have negative refractive power.

The first lens may have a first surface (object-side surface) that is convex. For example, the first lens may have the first surface that is convex and a second surface (image-side surface) that is concave. The first lens may have positive or negative refractive power as long as it satisfies the above-mentioned shape.

The first lens may have at least one aspherical surface. For example, both surfaces of the first lens may be aspherical. The first lens may be formed of a material having relatively high light transmissivity and/or excellent workability. For example, the first lens may be formed using a plastic material. However, a material of the first lens is not limited to a plastic material. For example, the first lens may be formed using glass.

The second lens may have refractive power. For example, the second lens may have positive refractive power. However, the second lens may have negative refractive power. In addition, the second lens may have refractive power stronger than that of the first lens. For example, the second lens may have a focal length shorter than that of the first lens. For example, the second lens may satisfy the following Conditional Expression.

[Conditional Expression] f2<f1

Here, f1 is a focal length of the first lens, and f2 is a focal length of the second lens.

The second lens may have biconvex surfaces or both surfaces that are convex. For example, a first surface of the second lens maybe convex toward an object, and a second surface of the second lens may be convex toward an image. The second lens may have positive or negative refractive power as long as it satisfies the above-mentioned shape.

The second lens may have an aspherical surface. For example, one or both surfaces of the second lens may be aspherical. The second lens may be formed of a material having relatively high light transmissivity and/or excellent workability. For example, the second lens may be formed using a plastic material. However, a material of the second lens is not limited to plastic. For example, the second lens may be formed using glass.

The third lens may have refractive power. For example, the third lens may have negative refractive power. However, the third lens may have positive refractive power. In addition, the third lens may have refractive power (for reference, refractive power is an inverse number of a focal length) weaker than those of the fifth and sixth lenses. For example, the third lens may satisfy the following Conditional Expressions.

[Conditional Expression] f5<f3
[Conditional Expression] f6<f3

Here, f3 is a focal length of the third lens, f5 is a focal length of the fifth lens, and f6 is a focal length of the sixth lens.

The third lens may have a meniscus shape which may be convex toward the object. For example, the third lens may have a first surface that is convex toward the object and a second surface that is concave toward the image. The third lens may have positive or negative refractive power as long as it satisfies the above-mentioned shape.

The third lens may have at least one aspherical surface. For example, one or both surfaces of the third lens may be aspherical. The third lens may be formed of a material having relatively high light transmissivity and/or excellent workability. For example, the third lens may be formed using a plastic material. However, a material of the third lens is not limited to plastic. For example, the third lens may be formed using glass. In addition, the third lens may be formed of a material having a relatively high refractive index. For example, the third lens may be formed of a material having a refractive index of 1.60 or more (in this case, the third lens may have an Abbe number of 30 or less). The third lens formed of this material may easily refract light even in a relatively small curvature shape. Therefore, the third lens formed of this material may be easily manufactured and may lower a defect rate with regard to manufacturing tolerance. In addition, the third lens formed of this material may allow a distance between lenses to be decreased, such that the lens module may be miniaturized.

The third lens may have a size smaller than at least one or both of the first and second lenses. For example, an effective diameter (for example, a diameter of a portion at which effective light is substantially incident and refracted) of the third lens may be smaller than one or both of the first and second lenses.

The fourth lens may have refractive power. For example, the fourth lens may have positive refractive power. However, the fourth lens may have negative refractive power.

The fourth lens may have biconvex surfaces. For example, a first surface of the fourth lens may be convex toward the object, and a second surface of the fourth lens may be convex toward the image. The fourth lens may have positive or negative refractive power as long as it satisfies the above-mentioned shape.

The fourth lens may have at least one aspherical surface. For example, one or both surfaces of the fourth lens may be aspherical. The fourth lens may be formed of a material having relatively high light transmissivity and/or excellent workability. For example, the fourth lens may be formed using a plastic material. However, a material of the fourth lens is not limited to plastic. For example, the fourth lens may be formed using glass. In addition, the fourth lens may be formed of a material having a high refractive index. For example, the fourth lens maybe formed of a material having a refractive index of 1.60 or more (in this case, the fourth lens may have an Abbe number of 30 or less). The fourth lens formed of this material may easily refract light even in a small curvature shape. Therefore, the fourth lens formed of this material maybe easily manufactured and may lower a defect rate with regard to manufacturing tolerance. In addition, the fourth lens formed of this material may allow a distance between lenses to be decreased, such that the lens module may be miniaturized.

The fifth lens may have refractive power. For example, the fifth lens may have negative refractive power. However, the fifth lens may have positive refractive power.

An image-side surface of the fifth lens may be convex. For example, the fifth lens may have a first surface that is concave toward the object and a second surface that is convex toward the image. The fifth lens may have positive or negative refractive power as long as it satisfies the above-mentioned shape.

The fifth lens may have at least one aspherical surface. For example, one or both surfaces of the fifth lens may be aspherical. The fifth lens may be formed of a material having relatively high light transmissivity and/or excellent workability. For example, the fifth lens may be formed using a plastic material. However, a material of the fifth lens is not limited to plastic. For example, the fifth lens may be formed using glass. In addition, the fifth lens may be formed of a material having a high refractive index. For example, the fifth lens maybe formed of a material having a refractive index of 1.60 or more (in this case, the fifth lens may have an Abbe number of 30 or less). The fifth lens formed of this material may easily refract light even in a small curvature shape. Therefore, the fifth lens formed of this material may be easily manufactured and may lower a defect rate with regard to manufacturing tolerance. In addition, the fifth lens formed of this material may allow a distance between lenses to be decreased, such that the lens module may be miniaturized.

The sixth lens may have refractive power. For example, the sixth lens may have negative refractive power. However, the sixth lens may have positive refractive power.

An image-side surface of the sixth lens may be concave. For example, the sixth lens may have a first surface that is convex toward the object and a second surface that is concave toward the image. The sixth lens may have positive or negative refractive power as long as it satisfies the above-mentioned shape.

The sixth lens may have at least one aspherical surface. For example, one or both surfaces of the sixth lens may be aspherical. In addition, the sixth lens may be formed to include at least one or more inflection points on one or both surfaces thereof. For example, the first surface of the sixth lens may be convex on an optical axis, and be concave in the vicinity of the optical axis. Additionally, the first surface of the sixth lens be convex at an edge thereof. The second surface of the sixth lens may be concave on an optical axis and become convex toward an edge thereof. The second surface of the sixth lens may be convex toward the image at the periphery. The sixth lens may be formed of a material having relatively high light transmissivity and/or excellent workability. For example, the sixth lens maybe formed using a plastic material. However, a material of the sixth lens is not limited to plastic. For example, the sixth lens may be formed using glass.

The image sensor (or image-sensing surface) may have a diameter smaller than effective diameters of one or more lenses. For example, a horizontal length or a vertical length of the image sensor may be smaller than an effective diameter of the image-side surface of the sixth lens. A deviation between a diagonal length of the image sensor and the effective diameter of the image-side surface of the sixth lens may be, for instance, but not limited to, 0.50 [mm] or more. This size limitation of the image sensor may be advantageous to a lens module having a handshaking correction function.

The image sensor may be configured to implement high resolution of, for example, but not limited to, 1300 megapixels. For example, a unit size of the pixels configuring the image sensor may be 1.12 μm or less.

The optical system of the lens module may be configured so that effective diameters of the lenses become smaller from the first lens toward the third lens and/or be increased from the fourth lens toward the sixth lens. The optical system configured as described above may increase an amount of light incident to the image sensor to increase resolution of the lens module.

The optical system of the lens module may be configured to have a low F No. For example, the optical system of the lens module may have an F No. of 2.3 or less. The optical system of the lens module may be configured to have a relatively short length (OAL). For example, OAL of the lens module may be 5.0 [mm] or less.

The lens module configured as described above may allow for reduction of aberration causing image quality deterioration. In addition, the lens module of embodiments of the present disclosure may be provided to implement high resolution. Further, the lens module configured as described above may be easily lightened and may reduce manufacturing costs.

A lens module according to a first exemplary embodiment of the present disclosure will hereinafter be described with reference to FIG. 1.

A lens module 100 may include an optical system including a first lens 110, a second lens 120, a third lens 130, a fourth lens 140, a fifth lens 150, and a sixth lens 160. In addition, the lens module 100 may further include an infrared cut-off filter 70 and an image sensor 80. Additionally, the lens module 100 may further include at least one stop. For example, the stop may be disposed between the second and third lenses 120 and 130. However, the stop may be disposed in front of the first lens 110, between the first lens 110 and the second lens 120 or anywhere between the third lens 130 and the sixth lens 160.

In the exemplary embodiment of the present disclosure, the first lens 110 may have positive refractive power. An object-side surface of the first lens 110 may be convex and an image-side surface of the first lens 110 may be concave. However, the first lens 110 may have negative refractive power. The second lens 120 may have positive refractive power. An object-side surface of the second lens 120 may be convex and an image-side surface of the second lens 120 may be convex. However, the second lens 120 may have negative refractive power. The third lens 130 may have negative refractive power. An object-side surface of the third lens 130 may be convex and an image-side surface of the third lens 130 may be concave. However, the third lens 130 may have positive refractive power. The fourth lens 140 may have positive refractive power. An object-side surface of the fourth lens 140 may be convex and an image-side surface of the fourth lens 140 may be convex. However, the fourth lens 140 may have negative refractive power. The fifth lens 150 may have negative refractive power. An object-side surface of the fifth lens 150 may be concave and an image-side surface of the fifth lens 150 may be convex. However, the fifth lens 150 may have positive refractive power. The sixth lens 160 may have negative refractive power. An object-side surface of the sixth lens 160 may be convex and an image-side surface of the sixth lens 160 may be concave. However, the sixth lens 160 may have positive refractive power. In addition, the sixth lens 160 may have one or more inflection points formed on at least one or each of the object-side surface and the image-side surface thereof.

Aberration characteristics of the lens module 100 will hereinafter be described with reference to FIG. 2.

Figure 2:
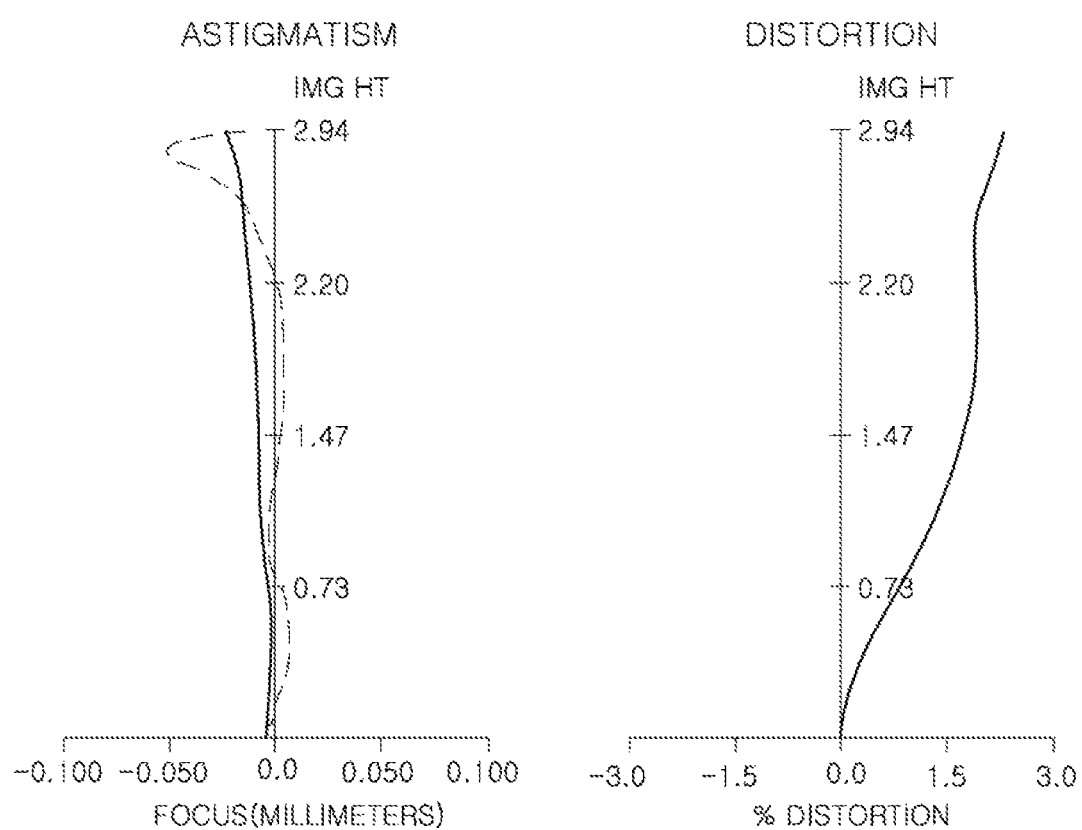
FIG. 2 is a curve illustrating aberration characteristics of the lens module illustrated in FIG. 1.

The lens module 100 may have astigmatism and distortion curves as illustrated in FIG. 2.

Exemplary characteristics of the optical system configuring the lens module 100 will hereinafter be described with reference to FIG. 3.

In FIG. 3, Surface Nos. 2 and 3 indicate the first and second surfaces of the first lens 110, respectively, and Surface Nos. 4 and 5 indicate the first and second surfaces of the second lens 120, respectively. In a similar scheme, Surface Nos. 7 to 14 indicate first and second surfaces of the third to sixth lenses 130 to 160, respectively. Meanwhile, Surface No. 6 indicates the stop, and Surface Nos. 15 and 16 indicate first and second surfaces of the infrared cut-off filter 70.

Aspherical values of the optical system configuring the lens module 100 of the first exemplary embodiment will hereinafter be described with reference to FIG. 4.

In FIG. 4, a horizontal axis of the table refers to Surface Nos. of the first to sixth lenses 110 to 160, and a vertical axis of the table refers to characteristics corresponding to each lens surface.

Figure 5:
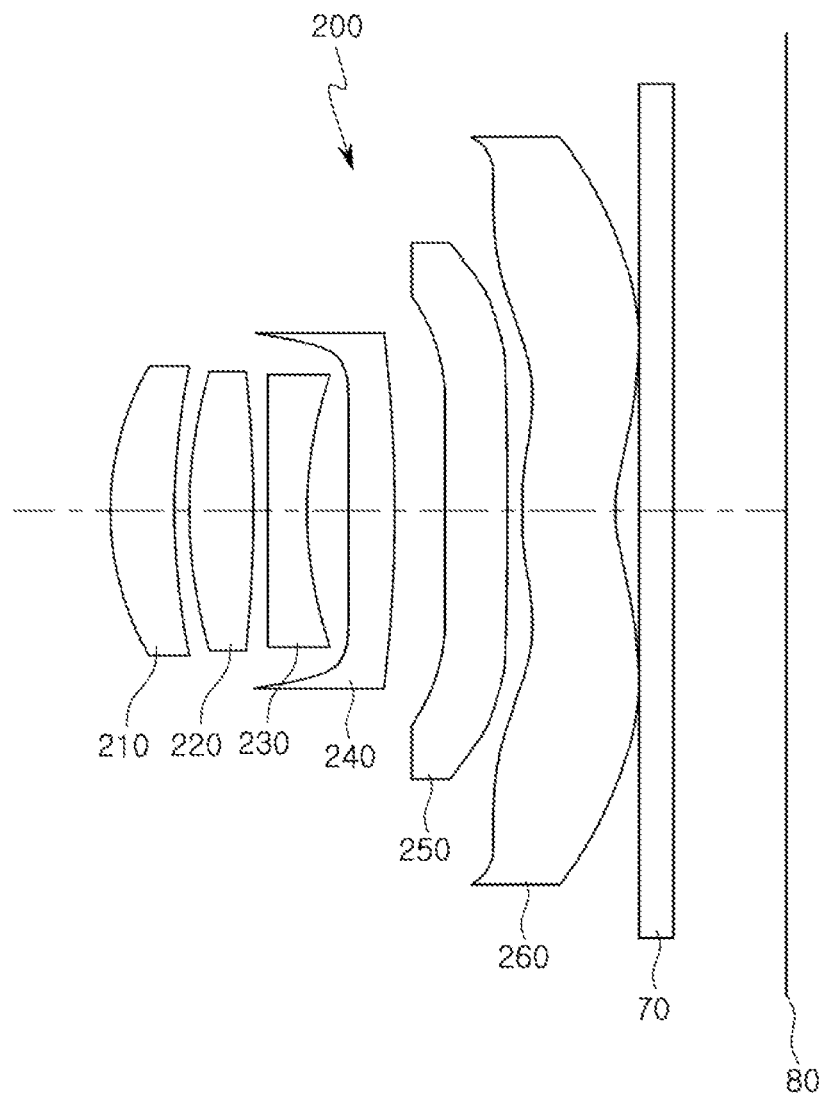
FIG. 5 is a configuration diagram of a lens module according to a second exemplary embodiment of the present disclosure.

A lens module according to a second exemplary embodiment of the present disclosure will hereinafter be described with reference to FIG. 5.

A lens module 200 may include an optical system including a first lens 210, a second lens 220, a third lens 230, a fourth lens 240, a fifth lens 250, and a sixth lens 260. In addition, the lens module 200 may further include an infrared cut-off filter 70 and an image sensor 80. Further, the lens module 200 may further include at least one stop. For example, the stop may be disposed between the second and third lenses 220 and 230. However, the stop may be disposed in front of the first lens 210, between the first lens 210 and the second lens 220 or anywhere between the third lens 230 and the sixth lens 260.

In the exemplary embodiment of the present disclosure, the first lens 210 may have positive refractive power. An object-side surface of the first lens 210 may be convex and an image-side surface of the first lens 210 may be concave. However, the first lens 210 may have negative refractive power. The second lens 220 may have positive refractive power. An object-side surface of the second lens 220 may be convex and an image-side surface of the second lens 220 may be convex. However, the second lens 220 may have negative refractive power. The third lens 230 may have negative refractive power. An object-side surface of the third lens 230 may be convex and an image-side surface of the third lens 230 may be concave. However, the third lens 230 may have positive refractive power. The fourth lens 240 may have positive refractive power. An object-side surface of the fourth lens 240 may be convex and an image-side surface of the fourth lens 240 may be convex. However, the fourth lens 240 may have negative refractive power. The fifth lens 250 may have negative refractive power. An object-side surface of the fifth lens 250 may be concave and an image-side surface of the fifth lens 250 may be convex. The sixth lens 260 may have negative refractive power. However, the sixth lens 260 may have positive refractive power. An object-side surface of the sixth lens 260 may be convex and an image-side surface of the sixth lens 260 may be concave. In addition, one or more inflection points may be formed on at least one or each of the object-side surface and the image-side surface of the sixth lens 260.

Aberration characteristics of the lens module 200 will hereinafter be described with reference to FIG. 6.

Figure 6:
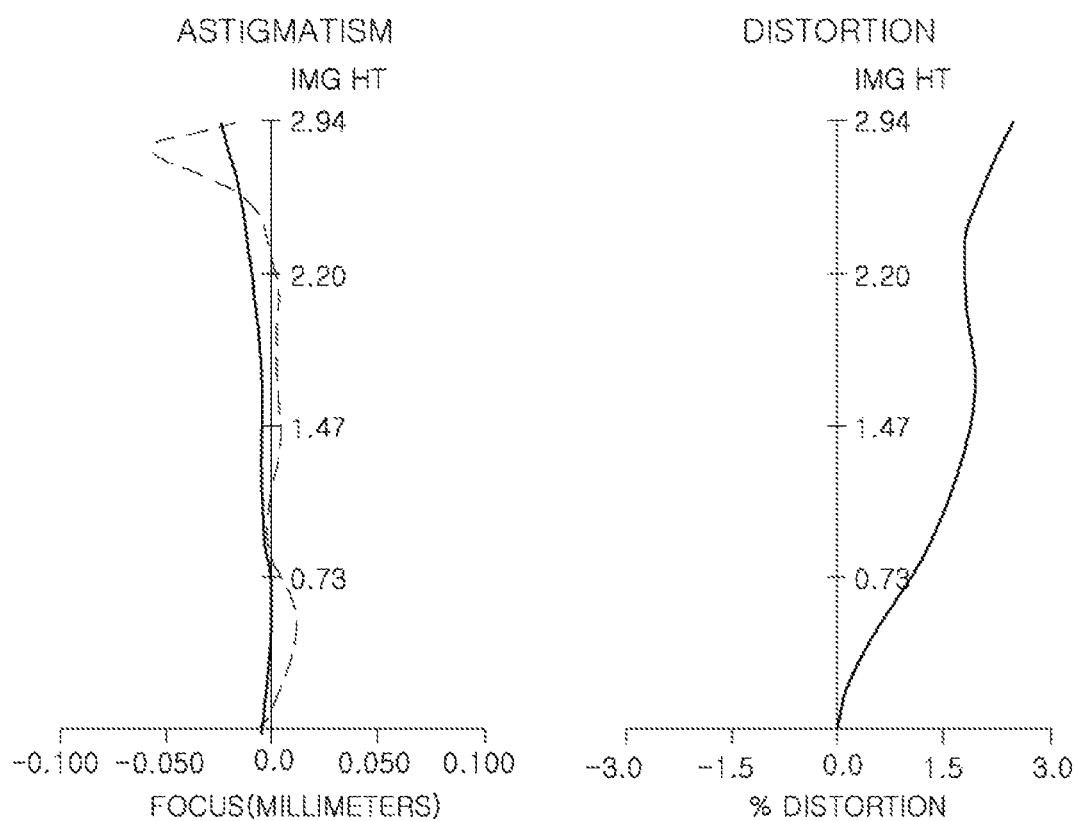
FIG. 6 is a curve illustrating aberration characteristics of the lens module illustrated in FIG. 5.

The lens module 200 may have astigmatism and distortion curves as illustrated in FIG. 6.

Exemplary characteristics of the optical system configuring the lens module 200 will hereinafter be described with reference to FIG. 7.

In FIG. 7, Surface Nos. 2 and 3 indicate the first and second surfaces of the first lens 210, respectively, and Surface Nos. 4 and 5 indicate the first and second surfaces of the second lens 220, respectively. In a similar scheme, Surface Nos. 7 to 14 indicate first and second surfaces of the third to sixth lenses 230 to 260, respectively. Meanwhile, Surface No. 6 indicates the stop, and Surface Nos. 15 and 16 indicate first and second surfaces of the infrared cut-off filter 70.

Aspherical values of the optical system configuring the lens module 200 of the second embodiment will hereinafter be described with reference to FIG. 8.

In FIG. 8, a horizontal axis of the table refers to Surface Nos. of the first to sixth lenses 210 to 260, and a vertical axis of the table refers to characteristics corresponding to each lens surface.

Figure 9:
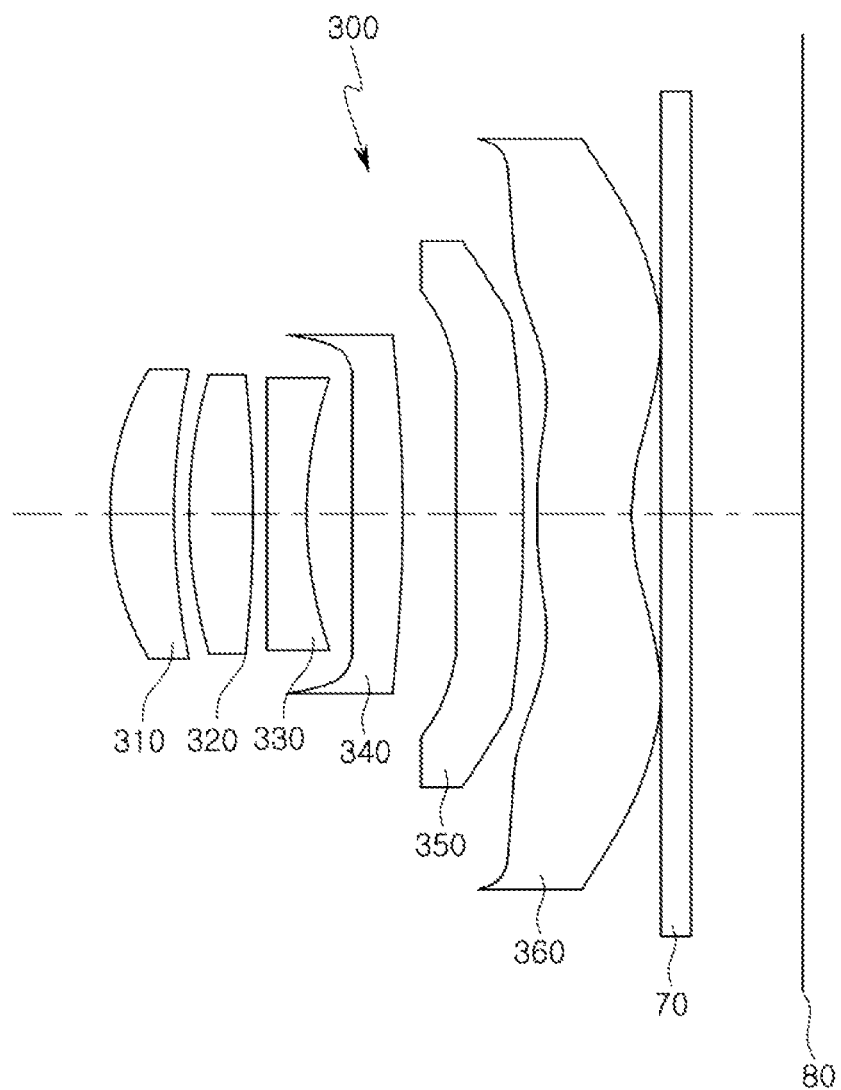
FIG. 9 is a configuration diagram of a lens module according to a third exemplary embodiment of the present disclosure.

A lens module according to a third exemplary embodiment of the present disclosure will hereinafter be described with reference to FIG. 9.

A lens module 300 may include an optical system including a first lens 310, a second lens 320, a third lens 330, a fourth lens 340, a fifth lens 350, and a sixth lens 360. In addition, the lens module 300 may further include an infrared cut-off filter 70 and an image sensor 80. Further, the lens module 300 may further include one or more stops. For example, the stop may be disposed between the second and third lenses 320 and 330. However, the stop may be disposed in front of the first lens 310, between the first lens 310 and the second lens 320 or anywhere between the third lens 330 and the sixth lens 360.

In the exemplary embodiment of the present disclosure, the first lens 310 may have positive refractive power. However, the first lens 310 may have negative refractive power. An object-side surface of the first lens 310 may be convex and an image-side surface of the first lens 310 may be concave. The second lens 320 may have positive refractive power. However, the second lens 320 may have negative refractive power. An object-side surface of the second lens 320 may be convex and an image-side surface of the second lens 320 maybe convex. The third lens 330 may have negative refractive power. However, the third lens 330 may have positive refractive power. An object-side surface of the third lens 330 may be convex and an image-side surface of the third lens 330 may be concave. The fourth lens 340 may have positive refractive power. However, the fourth lens 340 may have negative refractive power. An object-side surface of the fourth lens 340 may be convex and an image-side surface of the fourth lens 340 maybe convex. The fifth lens 350 may have negative refractive power. However, the fifth lens 350 may have positive refractive power. An object-side surface of the fifth lens 350 may be concave and an image-side surface of the fifth lens 350 may be convex. The sixth lens 360 may have negative refractive power. However, the sixth lens 360 may have positive refractive power. An object-side surface of the sixth lens 360 may be convex and an image-side surface of the sixth lens 360 may be concave. In addition, one or more inflection points may be formed on at least one or each of the object-side surface and the image-side surface of the sixth lens 360.

Aberration characteristics of the lens module 300 of the third embodiment will hereinafter be described with reference to FIG. 10.

Figure 10:
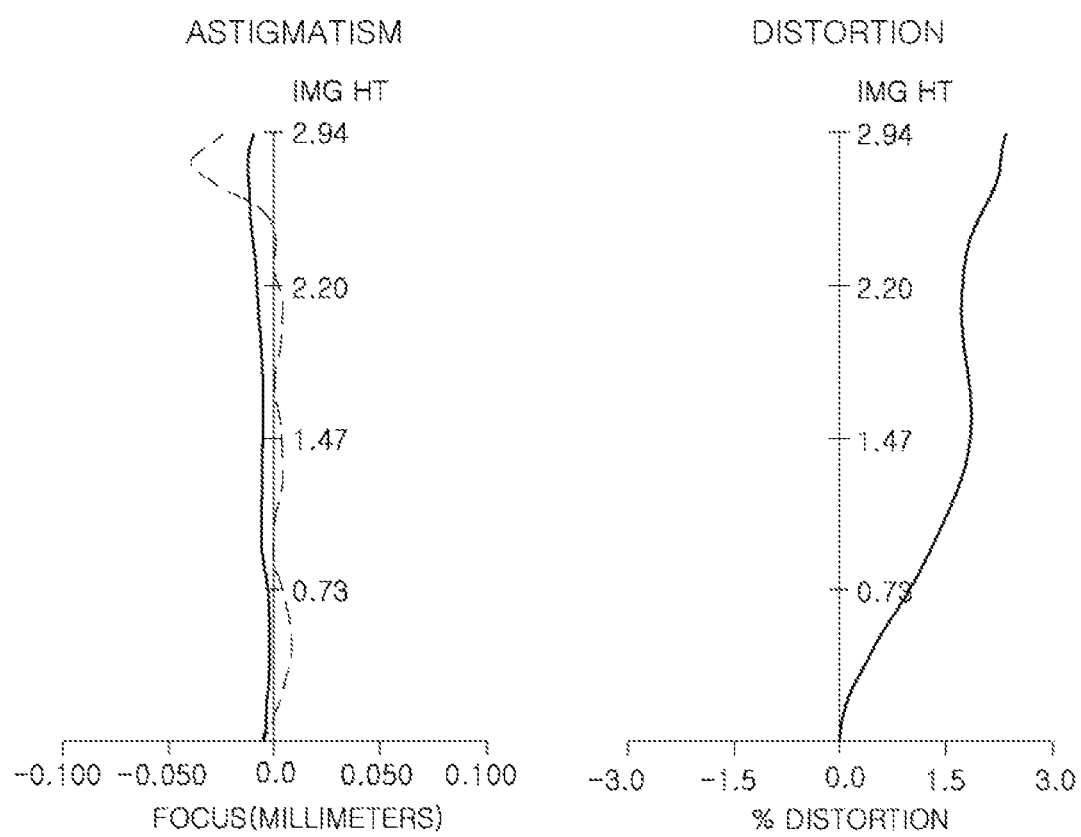
FIG. 10 is a curve illustrating aberration characteristics of the lens module illustrated in FIG. 9.

The lens module 300 may decrease astigmatism at an edge portion of the image-sensing surface, as illustrated in FIG. 10.

Exemplary characteristics of the optical system configuring the lens module 300 will hereinafter be described with reference to FIG. 11.

In FIG. 11, Surface Nos. 2 and 3 indicate the first and second surfaces of the first lens 310, respectively, and Surface Nos. 4 and 5 indicate the first and second surfaces of the second lens 320, respectively. In a similar scheme, Surface Nos. 7 to 14 indicate first and second surfaces of the third to sixth lenses 330 to 360, respectively. Meanwhile, Surface No. 6 indicates the stop, and Surface Nos. 15 and 16 indicate first and second surfaces of the infrared cut-off filter 70.

Aspherical values of the optical system configuring the lens module 300 will hereinafter be described with reference to FIG. 12.

In FIG. 12, a horizontal axis of the table refers to Surface Nos. of the first to sixth lenses 310 to 360, and a vertical axis of the table refers to characteristics corresponding to each lens surface.

Figure 13:
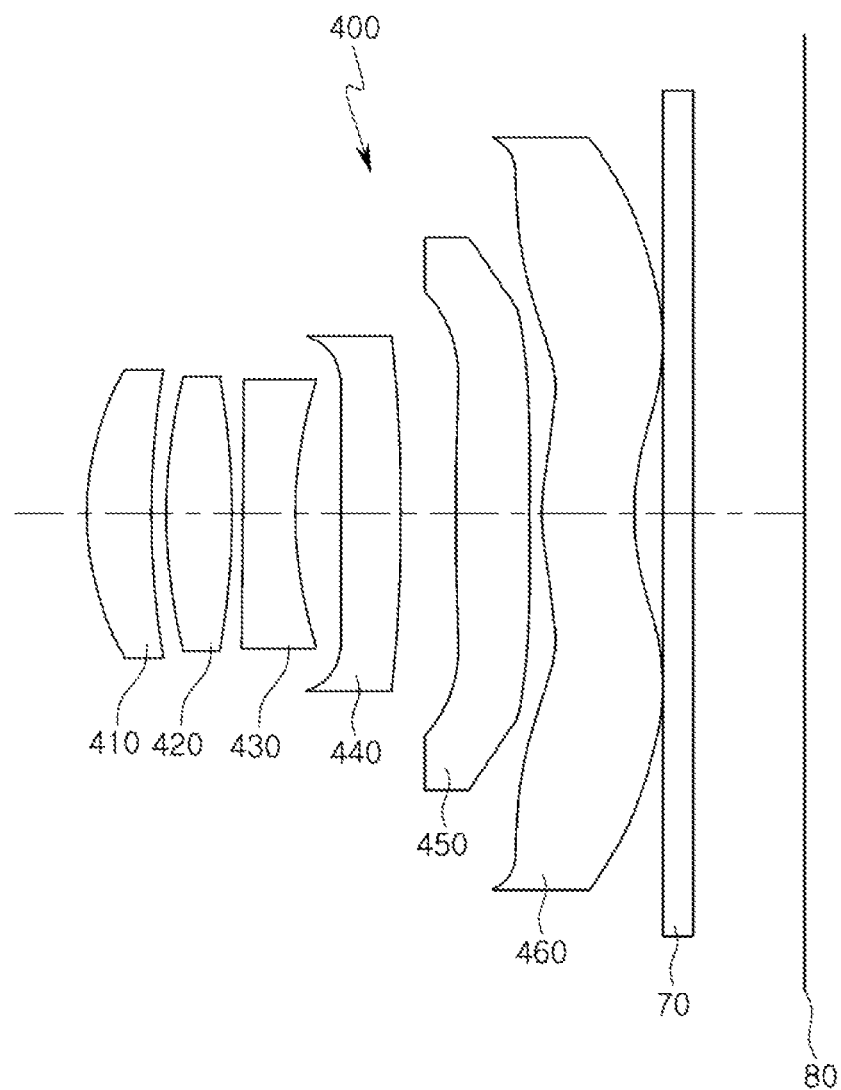
FIG. 13 is a configuration diagram of a lens module according to a fourth exemplary embodiment of the present disclosure.

A lens module according to a fourth exemplary embodiment of the present disclosure will hereinafter be described with reference to FIG. 13.

A lens module 400 may include an optical system including a first lens 410, a second lens 420, a third lens 430, a fourth lens 440, a fifth lens 450, and a sixth lens 460. In addition, the lens module 400 may further include an infrared cut-off filter 70 and an image sensor 80. Further, the lens module 400 may further include at least one stop. For example, the stop may be disposed between the second and third lenses 420 and 430. However, the stop may be disposed in front of the first lens 410, between the first lens 410 and the second lens 420 or anywhere between the third lens 430 and the sixth lens 460.

In the exemplary embodiment of the present disclosure, the first lens 410 may have positive refractive power. However, the first lens 410 may have negative refractive power. An object-side surface of the first lens 410 may be convex and an image-side surface of the first lens 410 may be concave. The second lens 420 may have positive refractive power. However, the second lens 420 may have negative refractive power. An object-side surface of the second lens 420 may be convex and an image-side surface of the second lens 420 maybe convex. The third lens 430 may have negative refractive power. However, the third lens 430 may have positive refractive power. An object-side surface of the third lens 430 may be convex and an image-side surface of the third lens 430 may be concave. The fourth lens 440 may have positive refractive power. However, the fourth lens 440 may have negative refractive power. An object-side surface of the fourth lens 440 may be convex and an image-side surface of the fourth lens 440 maybe convex. The fifth lens 450 may have negative refractive power. However, the fifth lens 450 may have positive refractive power. An object-side surface of the fifth lens 450 may be concave and an image-side surface of the fifth lens 450 may be convex. The sixth lens 460 may have negative refractive power. However, the sixth lens 460 may have positive refractive power. An object-side surface of the sixth lens 460 may be convex and an image-side surface of the sixth lens 460 may be concave. In addition, one or more inflection points may be formed on at least one or each of the object-side surface and the image-side surface of the sixth lens 460.

Aberration characteristics of the lens module 400 of the fourth embodiment will hereinafter be described with reference to FIG. 14.

Figure 14:
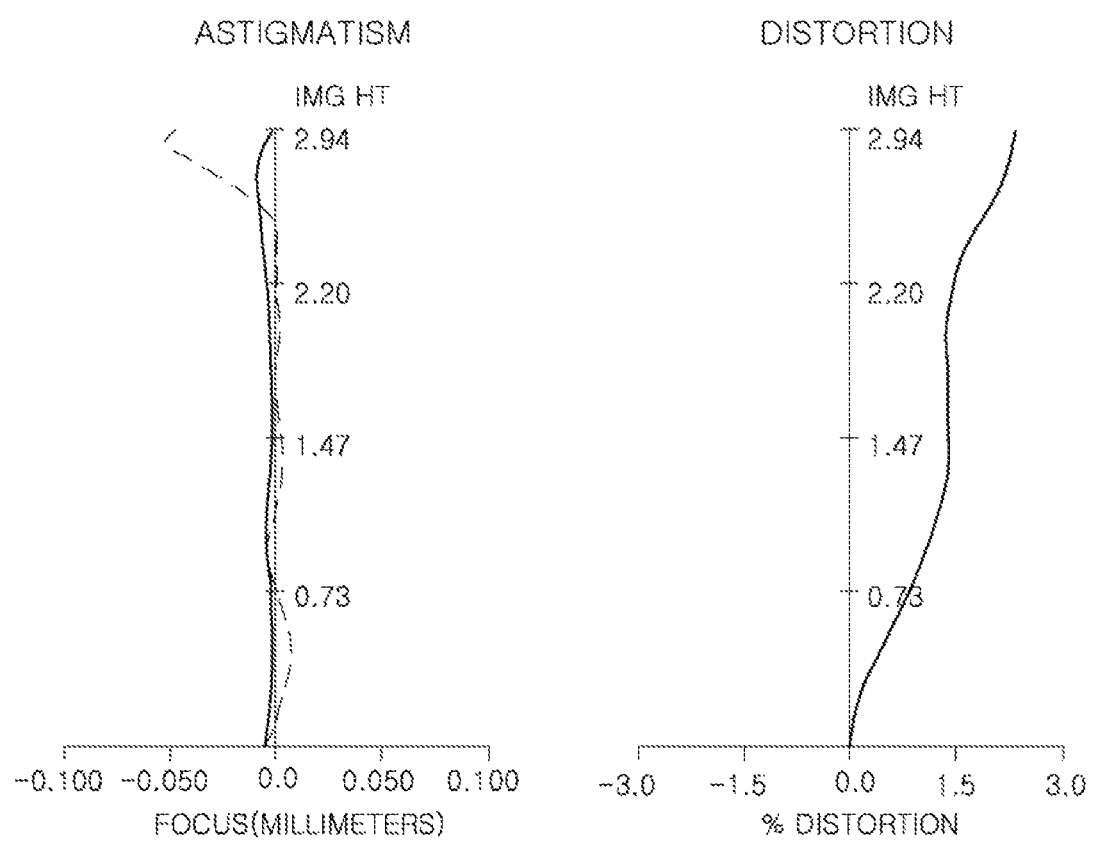
FIG. 14 is a curve illustrating aberration characteristics of the lens module illustrated in FIG. 13.

The lens module 400 may decrease astigmatism at an edge portion of the image-sensing surface, as illustrated in FIG. 14.

Exemplary characteristics of the optical system configuring the lens module 400 will hereinafter be described with reference to FIG. 15.

In FIG. 15, Surface Nos. 2 and 3 indicate the first and second surfaces of the first lens 410, respectively, and Surface Nos. 4 and 5 indicate the first and second surfaces of the second lens 420, respectively. In a similar scheme, Surface Nos. 7 to 14 indicate first and second surfaces of the third to sixth lenses 430 to 460, respectively. Meanwhile, Surface No. 6 indicates the stop, and Surface Nos. 15 and 16 indicate first and second surfaces of the infrared cut-off filter 70.

Aspherical values of the optical system configuring the lens module 400 will hereinafter be described with reference to FIG. 16.

In FIG. 16, a horizontal axis of the table refers to Surface Nos. of the first to sixth lenses 410 to 460, and a vertical axis of the table refers to characteristics corresponding to each lens surface.

Figure 17:
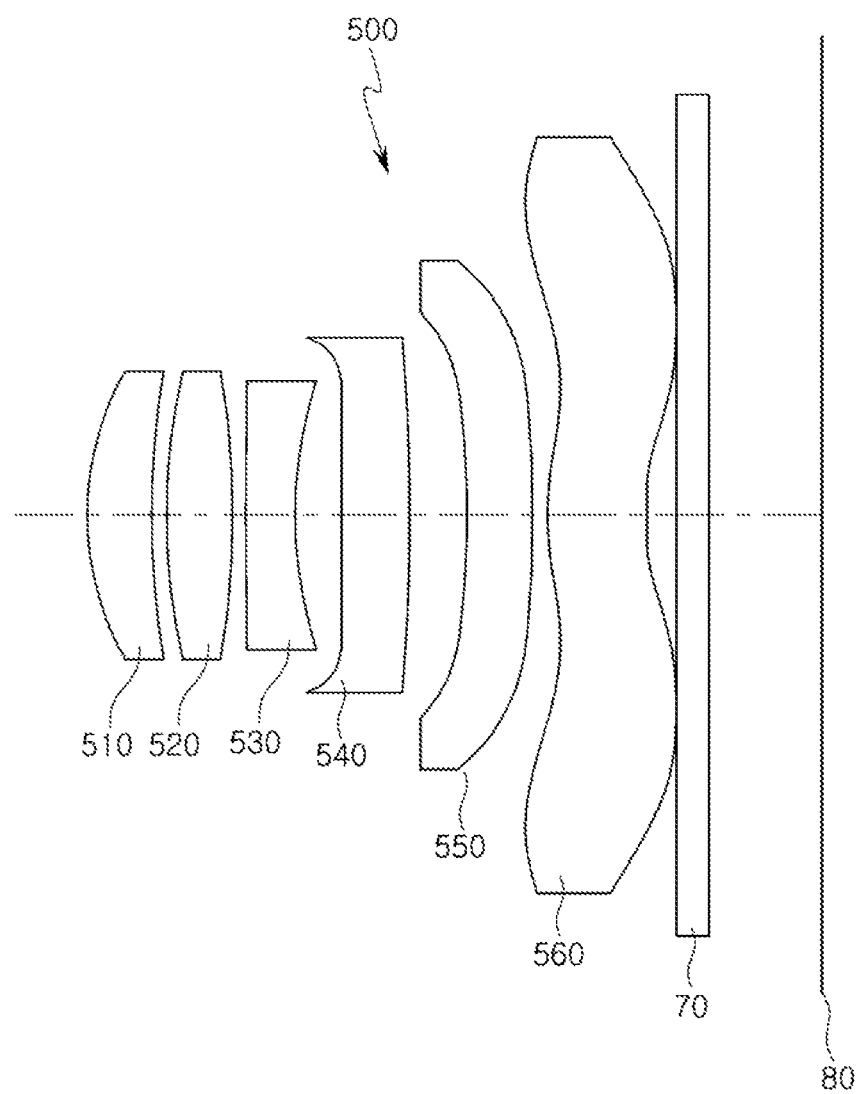
FIG. 17 is a configuration diagram of a lens module according to a fifth exemplary embodiment of the present disclosure.

A lens module according to a fifth exemplary embodiment of the present disclosure will hereinafter be described with reference to FIG. 17.

A lens module 500 may include an optical system including a first lens 510, a second lens 520, a third lens 530, a fourth lens 540, a fifth lens 550, and a sixth lens 560. In addition, the lens module 500 may further include an infrared cut-off filter 70 and an image sensor 80. Further, the lens module 500 may further include at least one stop. For example, the stop may be disposed between the second and third lenses 520 and 530. However, the stop may be disposed in front of the first lens 510, between the first lens 510 and the second lens 520 or anywhere between the third lens 530 and the sixth lens 560.

In the exemplary embodiment of the present disclosure, the first lens 510 may have positive refractive power. However, the first lens 510 may have negative refractive power. An object-side surface of first lens 510 may be convex and an image-side surface of the first lens 510 may be concave. The second lens 520 may have positive refractive power. However, the second lens 520 may have negative refractive power. An object-side surface of the second lens 520 may be convex while an image-side surface of the second lens 520 maybe convex. The third lens 530 may have negative refractive power. However, the third lens 530 may have positive refractive power. An object-side surface of the third lens 530 may be convex and an image-side surface of the third lens 530 may be concave. The fourth lens 540 may have positive refractive power. However, the fourth lens 540 may have negative refractive power. An object-side surface of the fourth lens 540 may be convex and an image-side surface of the fourth lens 540 maybe convex. The fifth lens 550 may have negative refractive power. However, the fifth lens 550 may have positive refractive power. An object-side surface of the fifth lens 550 may be concave and an image-side surface of the fifth lens 550 may be convex. The sixth lens 560 may have negative refractive power. However, the sixth lens 560 may have positive refractive power. An object-side surface of the sixth lens 560 may be convex and an image-side surface of the sixth lens 560 may be concave. In addition, one or more inflection points may be formed on at least one or each of the object-side surface and the image-side surface of the sixth lens 560.

Aberration characteristics of the lens module 500 of the fifth exemplary embodiment will hereinafter be described with reference to FIG. 18.

Figure 18:
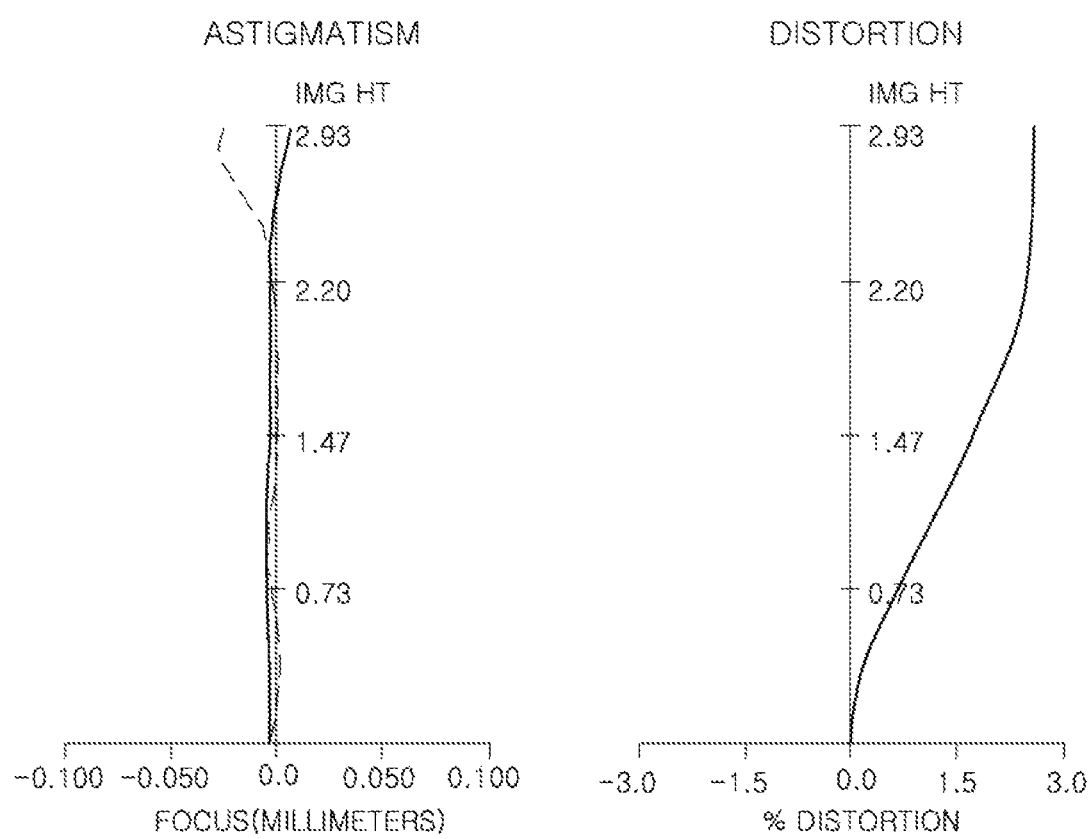
FIG. 18 is a curve illustrating aberration characteristics of the lens module illustrated in FIG. 17.

The lens module 500 may have substantially constant astigmatism from the center of the image-sensing surface to an edge thereof, as illustrated in FIG. 18.

Exemplary characteristics of the optical system configuring the lens module 500 will hereinafter be described with reference to FIG. 19.

In FIG. 19, Surface Nos. 2 and 3 indicate the first and second surfaces of the first lens 510, respectively, and Surface Nos. 4 and 5 indicate the first and second surfaces of the second lens 520, respectively. In a similar scheme, Surface Nos. 7 to 14 indicate first and second surfaces of the third to sixth lenses 530 to 560, respectively. Meanwhile, Surface No. 6 indicates the stop, and Surface Nos. 15 and 16 indicate first and second surfaces of the infrared cut-off filter 70.

Aspherical values of the optical system configuring the lens module 500 of the fifth exemplary embodiment will hereinafter be described with reference to FIG. 20.

In FIG. 20, a horizontal axis the table refers to Surface Nos. of the first to sixth lenses 510 to 560, and a vertical axis of the table refers to characteristics corresponding to each lens surface.

Figure 21:
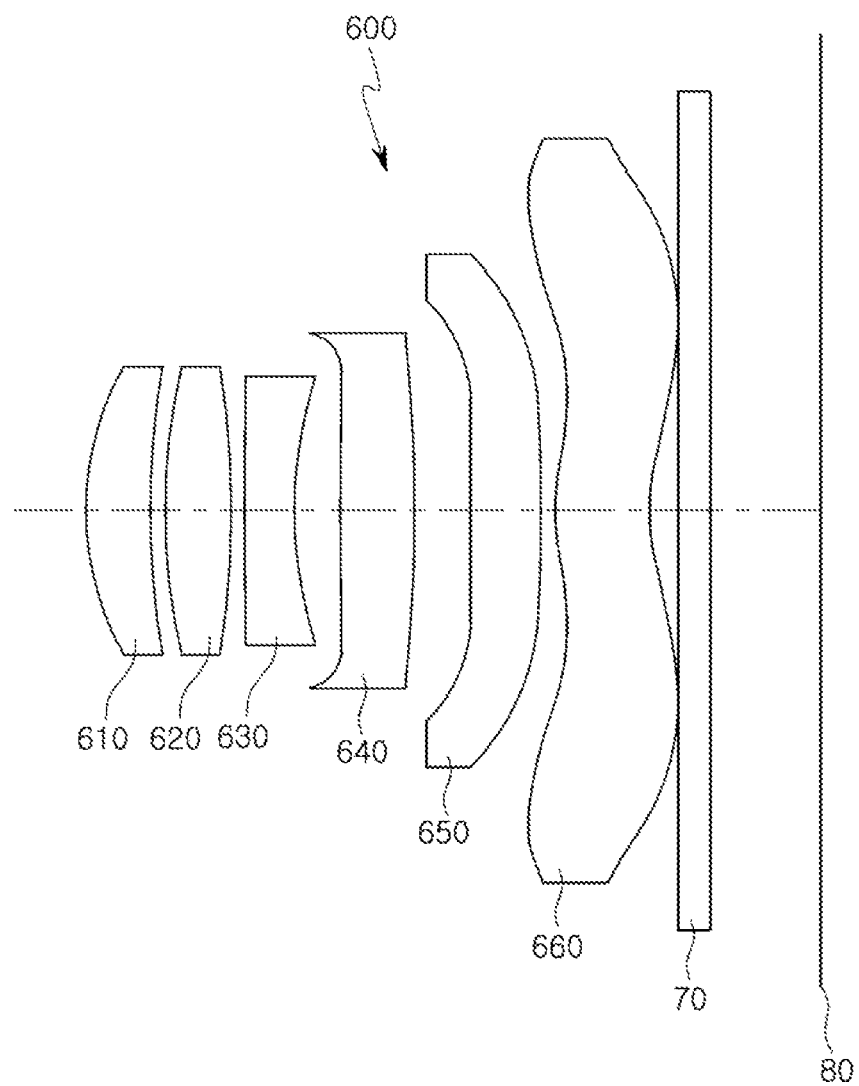
FIG. 21 is a configuration diagram of a lens module according to a sixth exemplary embodiment of the present disclosure.

A lens module according to a sixth exemplary embodiment of the present disclosure will hereinafter be described with reference to FIG. 21.

A lens module 600 may include an optical system including a first lens 610, a second lens 620, a third lens 630, a fourth lens 640, a fifth lens 650, and a sixth lens 660. In addition, the lens module 600 may further include an infrared cut-off filter 70 and an image sensor 80. Further, the lens module 600 may further include at least one stop. For example, the stop may be disposed between the second and third lenses 620 and 630. However, the stop may be disposed in front of the first lens 610, between the first lens 610 and the second lens 620 or anywhere between the third lens 630 and the sixth lens 660.

In the exemplary embodiment of the present disclosure, the first lens 610 may have positive refractive power. However, the first lens 610 may have negative refractive power. An object-side surface of the first lens 610 may be convex and an image-side surface of the first lens 610 may be concave. The second lens 620 may have positive refractive power. However, the second lens 620 may have positive refractive power. An object-side surface of the second lens 620 may be convex and an image-side surface of the second lens 620 maybe convex. The third lens 630 may have negative refractive power. However, the third lens 630 may have negative refractive power. An object-side surface of the third lens 630 may be convex and an image-side surface of the third lens 630 may be concave. The fourth lens 640 may have positive refractive power. However, the fourth lens 640 may have negative refractive power. An object-side surface of the fourth lens 640 may be convex and an image-side surface of the fourth lens 640 maybe convex. The fifth lens 650 may have negative refractive power. However, the fifth lens 650 may have positive refractive power. An object-side surface of the fifth lens 650 may be concave and an image-side surface of the fifth lens 650 may be convex. The sixth lens 660 may have negative refractive power. However, the sixth lens 660 may have positive refractive power. An object-side surface of the sixth lens 660 may be convex and an image-side surface of the sixth lens 660 may be concave. In addition, one or more inflection points may be formed on at least one or each of the object-side surface and the image-side surface of the sixth lens 660.

Aberration characteristics of the lens module 600 of the sixth exemplary embodiment will hereinafter be described with reference to FIG. 22.

Figure 22:
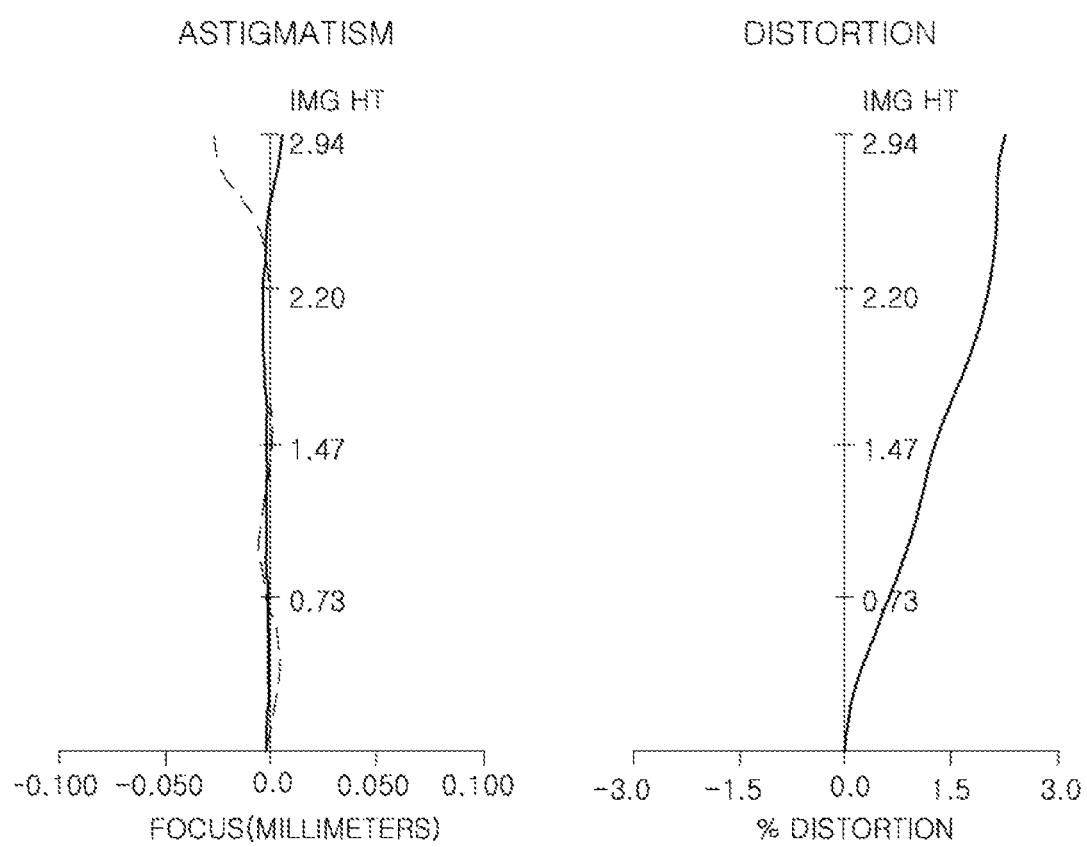
FIG. 22 is a curve illustrating aberration characteristics of the lens module illustrated in FIG. 21.

The lens module 600 may have substantially constant astigmatism from the center of the image-sensing surface to an edge thereof, as illustrated in FIG. 22.

Exemplary characteristics of the optical system configuring the lens module 600 will hereinafter be described with reference to FIG. 23.

In FIG. 23, Surface Nos. 2 and 3 indicate the first and second surfaces of the first lens 610, respectively, and Surface Nos. 4 and 5 indicate the first and second surfaces of the second lens 620, respectively. In a similar scheme, Surface Nos. 7 to 14 indicate first and second surfaces of the third to sixth lenses 630 to 660, respectively. Meanwhile, Surface No. 6 indicates the stop, and Surface Nos. 15 and 16 indicate first and second surfaces of the infrared cut-off filter 70.

Aspherical values of the optical system configuring the lens module 600 of the sixth exemplary embodiments will hereinafter be described with reference to FIG. 24.

In FIG. 24, a horizontal axis of the table refers to Surface Nos. of the first to sixth lenses 610 to 660, and a vertical axis of the table refers to characteristics corresponding to each lens surface.

Figure 25:
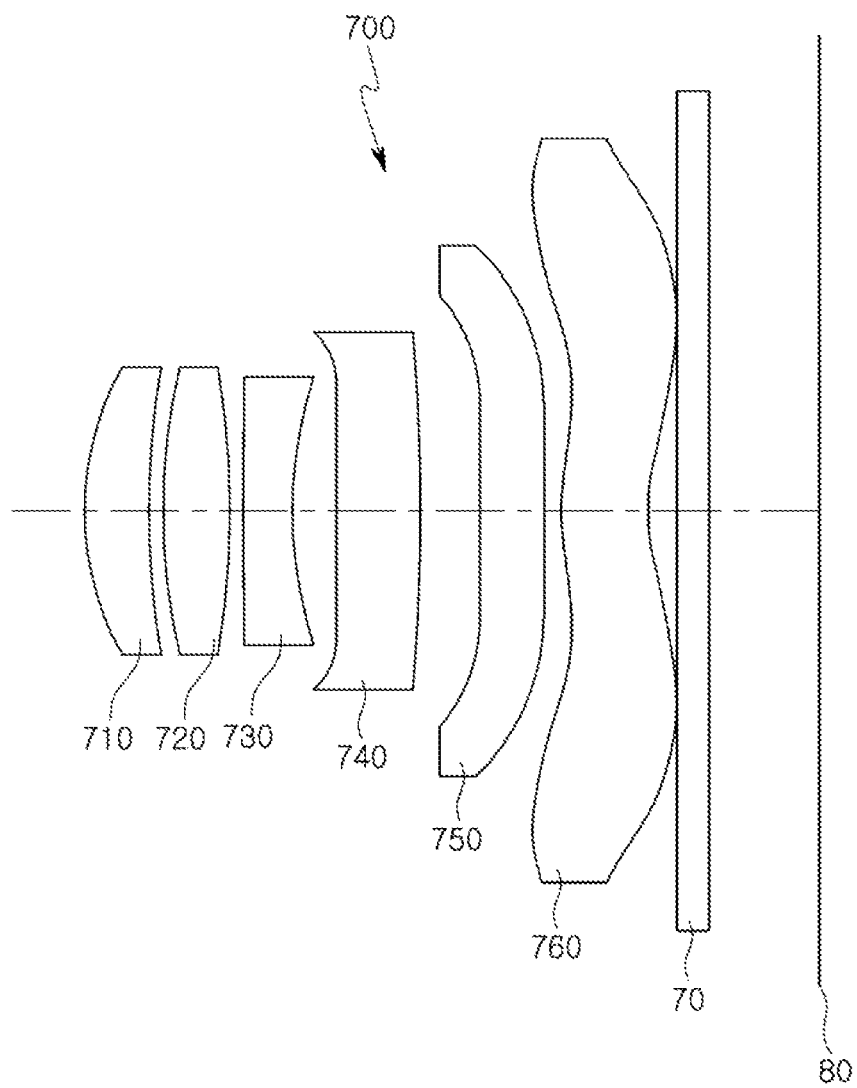
FIG. 25 is a configuration diagram of a lens module according to a seventh exemplary embodiment of the present disclosure.

A lens module according to a seventh exemplary embodiment of the present disclosure will hereinafter be described with reference to FIG. 25.

A lens module 700 may include an optical system including a first lens 710, a second lens 720, a third lens 730, a fourth lens 740, a fifth lens 750, and a sixth lens 760. In addition, the lens module 700 may further include an infrared cut-off filter 70 and an image sensor 80. Further, the lens module 700 may further include at least one stop. For example, the stop may be disposed between the second and third lenses 720 and 730. However, the stop may be disposed in front of the first lens 710, between the first lens 710 and the second lens 720 or anywhere between the third lens 730 and the sixth lens 760.

In the exemplary embodiment of the present disclosure, the first lens 710 may have positive refractive power. However, the first lens 710 may have negative refractive power. An object-side surface of the first lens 710 may be convex and an image-side surface of the first lens 710 may be concave. The second lens 720 may have positive refractive power. However, the second lens 720 may have negative refractive power. An object-side surface of the second lens 720 may be convex and an image-side surface of the second lens 720 maybe convex. The third lens 730 may have negative refractive power. However, the third lens 730 may have positive refractive power. An object-side surface of the third lens 730 may be convex and an image-side surface of the third lens 730 may be concave. The fourth lens 740 may have positive refractive power. However, the fourth lens 740 may have negative refractive power. An object-side surface of the fourth lens 740 may be convex and an image-side surface of the fourth lens 740 maybe convex. The fifth lens 750 may have negative refractive power. However, the fifth lens 750 may have positive refractive power. An object-side surface of the fifth lens 750 may be concave and an image-side surface of the fifth lens 750 may be convex. The sixth lens 760 may have negative refractive power. However, the sixth lens 760 may have positive refractive power. An object-side surface of the sixth lens 760 may be convex and an image-side surface of the sixth lens 760 may be concave. In addition, one or more inflection points may be formed on at least one or each of the object-side surface and the image-side surface of the sixth lens 760.

Aberration characteristics of the lens module 700 of the seventh exemplary embodiment will hereinafter be described with reference to FIG. 26.

Figure 26:
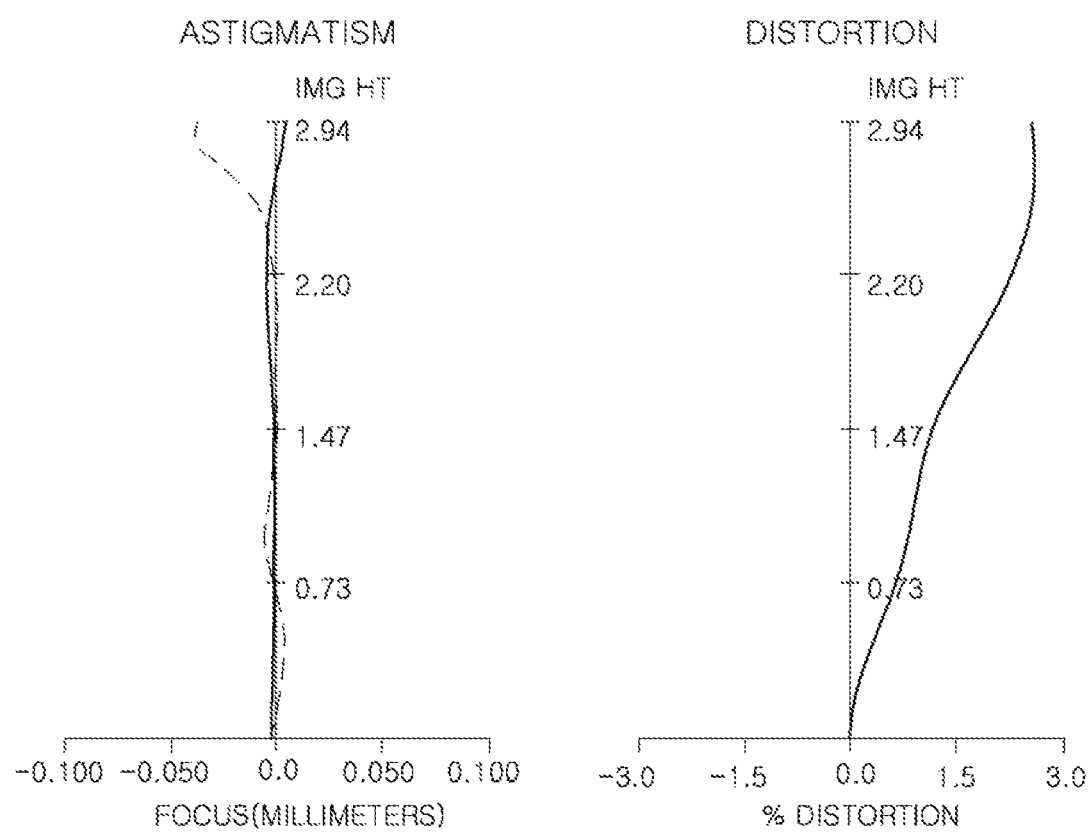
FIG. 26 is a curve illustrating aberration characteristics of the lens module illustrated in FIG. 25.

The lens module 700 may have substantially constant astigmatism from the center of the image-sensing surface to an edge thereof, as illustrated in FIG. 26.

Exemplary characteristics of the optical system configuring the lens module 700 will hereinafter be described with reference to FIG. 27.

In FIG. 27, Surface Nos. 2 and 3 indicate the first and second surfaces of the first lens 710, respectively, and Surface Nos. 4 and 5 indicate the first and second surfaces of the second lens 720, respectively. In a similar scheme, Surface Nos. 7 to 14 indicate first and second surfaces of the third to sixth lenses 730 to 760, respectively. Meanwhile, Surface No. 6 indicates the stop, and Surface Nos. 15 and 16 indicate first and second surfaces of the infrared cut-off filter 70.

Aspherical values of the optical system configuring the lens module 700 of the seventh exemplary embodiment will hereinafter be described with reference to FIG. 28.

In FIG. 28, a horizontal axis of the table refers to Surface Nos. of the first to sixth lenses 710 to 760, and a vertical axis of the table refers to characteristics corresponding to each lens surface.

Table 1 (shown below) shows optical characteristics of the lens modules according to the first to seventh exemplary embodiments in the present disclosure. As seen in Table 1, the lens modules may substantially have an F No. of 2.00 to 2.35. In addition, the lens module may substantially have an overall focal length (f) of 3.80 to 4.60. In the lens module, a focal length (f1) of the first lens may be substantially within a range of 6.0 to 6.9. In the lens module, a focal length (f2) of the second lens may be substantially within a range of 4.0 to 4.7. In the lens module, a focal length (f3) of the third lens may be substantially within a range of −5.4 to −4.0. In the lens module, a focal length (f4) of the fourth lens may be substantially within a range of 19.0 to 32.0. In the lens module, a focal length (f5) of the fifth lens may be substantially within a range of −230 to −20. In the lens module, a focal length (f6) of the sixth lens may be substantially within a range of −30.0 to −10.0. In the lens module, an overall length of the optical system may be substantially within a range of 4.3 to 5.2. In the lens module, BFL may be substantially within a range of 1.04 to 1.29. In the lens module, a field of view (ANG) of the optical system may be substantially within a range of 64 to 75 degrees. In the lens module, a radius (EPD/2) of an entrance pupil may be substantially within a range of 0.9 to 1.0.

TABLE 1

|  | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment |
|---|---|---|---|---|---|---|---|
| Fno. | 2.09 | 2.11 | 2.12 | 2.22 | 2.28 | 2.30 | 2.31 |
| f (EFL) | 3.971 | 4.003 | 4.026 | 4.210 | 4.341 | 4.376 | 4.393 |
| f1 | 6.480 | 6.596 | 6.709 | 6.601 | 6.360 | 6.284 | 6.487 |
| f2 | 4.421 | 4.475 | 4.441 | 4.326 | 4.399 | 4.319 | 4.170 |
| f3 | −5.168 | −5.167 | −4.954 | −4.439 | −4.518 | −4.302 | −4.206 |
| f4 | 21.220 | 21.433 | 21.834 | 24.603 | 25.577 | 26.649 | 29.468 |
| f5 | −69.28 | −95.42 | −105.03 | −30.31 | −23.93 | −42.22 | −218.80 |
| f6 | −14.369 | −15.397 | 18.792 | −19.232 | −32.481 | −18.031 | −12.579 |
| OAL | 4.570 | 4.623 | 4.684 | 4.869 | 4.970 | 4.970 | 4.970 |
| BFL | 1.144 | 1.152 | 1.159 | 1.166 | 1.189 | 1.172 | 1.160 |
| ANG | 71.61 | 71.08 | 70.85 | 68.48 | 66.77 | 66.50 | 66.14 |
| EPD/2 | 0.95 | 0.95 | 0.95 | 0.95 | 0.95 | 0.95 | 0.95 |

Table 2 (shown below) shows numerical ranges of Conditional Expressions and values of Conditional Expressions of the lens modules according to the first to seventh exemplary embodiments in the present disclosure.

TABLE 2

|  | Conditional Expression | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment |
|---|---|---|---|---|---|---|---|---|
| 1 | $1.3 < f1/f < 2.5$ | 1.63 | 1.65 | 1.67 | 1.57 | 1.47 | 1.44 | 1.48 |
| 2 | $32.0 < v1 - v3$ | 32.9 | 32.9 | 32.9 | 32.9 | 32.9 | 32.9 | 32.9 |
| 3 | $30.0 < v1 - v4$ | 32.9 | 32.9 | 32.9 | 32.9 | 32.9 | 32.9 | 32.9 |
| 4 | $32.0 < v1 - v5$ | 32.9 | 32.9 | 32.9 | 32.9 | 32.9 | 32.9 | 32.9 |
| 5 | $0.9 < f2/f$ | 1.11 | 1.12 | 1.10 | 1.03 | 1.01 | 0.99 | 0.95 |
| 6 | $f3/f < -0.9$ | −1.30 | −1.29 | −1.23 | −1.05 | −1.04 | −0.98 | −0.96 |
| 7 | $3.0 < f4/f$ | 5.34 | 5.35 | 5.42 | 5.84 | 5.89 | 6.09 | 6.71 |
| 8 | $f5/f < -3.0$ | −17.45 | −23.84 | −26.09 | −19.08 | −5.51 | −9.65 | −49.81 |
| 9 | $1.1 < OAL/f$ | 1.15 | 1.15 | 1.16 | 1.16 | 1.14 | 1.14 | 1.13 |
| 10 | $1.4 < f1/f2 < 5.0$ | 1.47 | 1.47 | 1.51 | 1.53 | 1.45 | 1.45 | 1.56 |
| 11 | $f2/f3 < 0.8$ | −0.86 | −0.87 | −0.90 | −0.97 | −0.97 | −1.00 | −0.99 |
| 12 | $0.25 < BFL/f < 0.35$ | 0.29 | 0.29 | 0.29 | 0.28 | 0.27 | 0.27 | 0.26 |
| 13 | $0.02 < D12/f$ | 0.03 | 0.02 | 0.02 | 0.02 | 0.02 | 0.02 | 0.02 |
| 14 | $0.3 < r1/f < 0.8$ | 0.41 | 0.41 | 0.41 | 0.41 | 0.40 | 0.39 | 0.39 |
| 15 | $2.0 < r5/f$ | 3.42 | 4.71 | 5.25 | 7.37 | 8.77 | 9.11 | 8.22 |
| 16 | $4.0 < r9/f$ | 10.24 | 7.49 | 4.97 | 5.21 | 4.01 | 4.42 | 4.60 |
| 17 | $0.1 < EPD/2/f1$ | 0.15 | 0.14 | 0.14 | 0.14 | 0.15 | 0.15 | 0.15 |
| 18 | $0.75 < AL/ImgH/<0.85$ | 0.78 | 0.79 | 0.80 | 0.83 | 0.83 | 0.85 | 0.85 |

As seen in Table 2, the lens modules according to first to seventh exemplary embodiments in the present disclosure may satisfy at least one or all of the Conditional Expressions.

Figure 29:
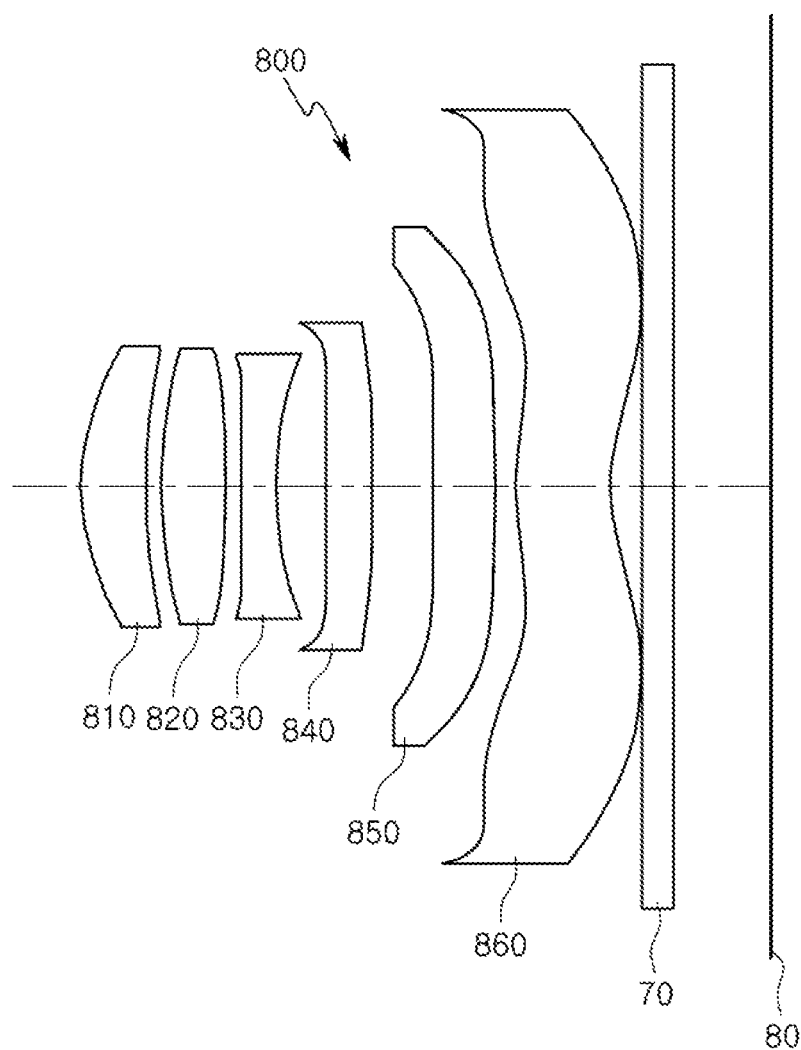
FIG. 29 is a configuration diagram of a lens module according to an eighth exemplary embodiment of the present disclosure.

A lens module according to an eighth exemplary embodiment of the present disclosure will hereinafter be described with reference to FIG. 29.

A lens module 800 may include an optical system including a first lens 810, a second lens 820, a third lens 830, a fourth lens 840, a fifth lens 850, and a sixth lens 860. In addition, the lens module 800 may further include an infrared cut-off filter 70 and an image sensor 80. Further, the lens module 800 may further include at least one stop. For example, the stop may be disposed between the second and third lenses 820 and 830. However, the stop may be disposed in front of the first lens 810, between the first lens 810 and the second lens 820 or anywhere between the third lens 830 and the sixth lens 860.

In the exemplary embodiment of the present disclosure, the first lens 810 may have positive refractive power. However, the first lens 810 may have negative refractive power. An object-side surface of the first lens 810 may be convex and an image-side surface of the first lens 810 may be concave. The second lens 820 may have positive refractive power. However, the second lens 820 may have negative refractive power. An object-side surface of the second lens 820 may be convex and an image-side surface of the second lens 820 maybe convex. The third lens 830 may have negative refractive power. However, the third lens 830 may have positive refractive power. An object-side surface of the third lens 830 may be convex and an image-side surface of the third lens 830 may be concave. The fourth lens 840 may have positive refractive power. However, the fourth lens 840 may have negative refractive power. An object-side surface of the fourth lens 840 may be convex and an image-side surface of the fourth lens 840 maybe convex. The fifth lens 850 may have positive refractive power. However, the fifth lens 850 may have negative refractive power. An object-side surface of the fifth lens 850 may be concave and an image-side surface of the fifth lens 850 may be convex. The sixth lens 860 may have negative refractive power. However, the sixth lens 860 may have positive refractive power. An object-side surface of the sixth lens 860 may be convex and an image-side surface of the sixth lens 860 may be concave. In addition, one or more inflection points may be formed on at least one or each of the object-side surface and the image-side surface of the sixth lens 860.

Aberration characteristics of the lens module 800 of the eighth exemplary embodiment will hereinafter be described with reference to FIG. 30.

Figure 30:
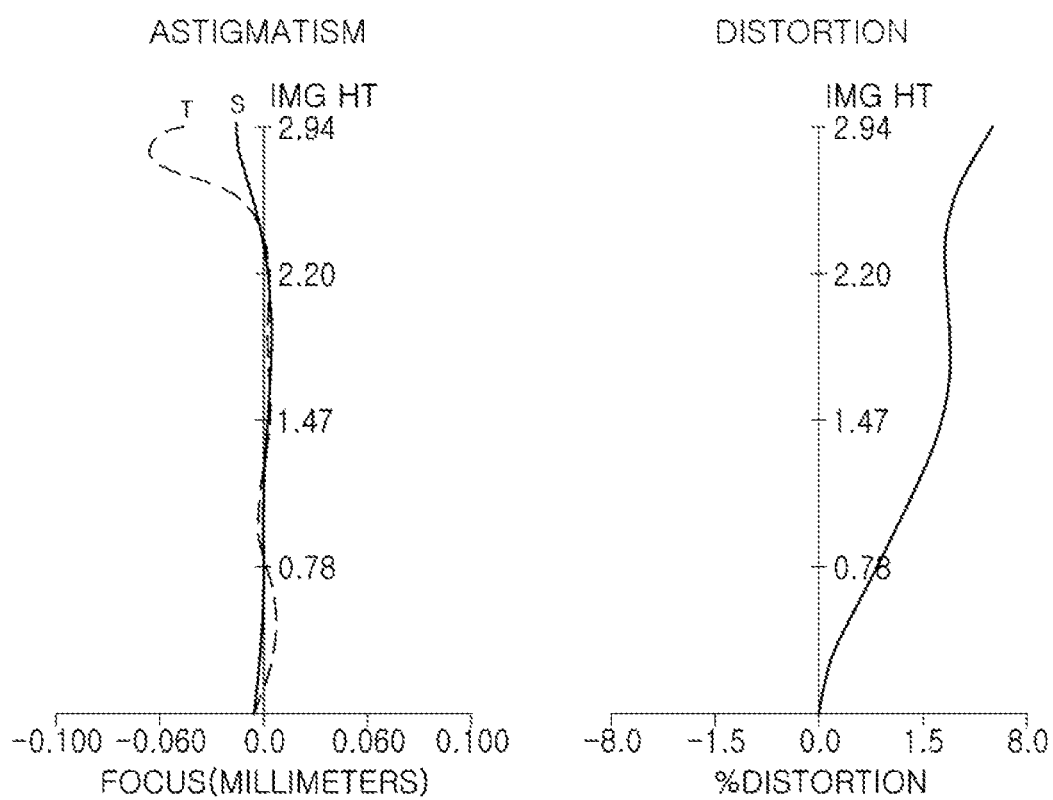
FIG. 30 is a curve illustrating aberration characteristics of the lens module illustrated in FIG. 29.

The lens module 800 may have substantially constant astigmatism from the center of the image-sensing surface to an edge thereof, as illustrated in FIG. 30.

Exemplary characteristics of the optical system configuring the lens module 800 will hereinafter be described with reference to FIG. 31.

In FIG. 31, Surface Nos. 2 and 3 indicate the first and second surfaces of the first lens 810, respectively, and Surface Nos. 4 and 5 indicate the first and second surfaces of the second lens 820, respectively. In a similar scheme, Surface Nos. 7 to 14 indicate first and second surfaces of the third to sixth lenses 830 to 860, respectively. Meanwhile, Surface No. 6 indicates the stop, and Surface Nos. 15 and 16 indicate first and second surfaces of the infrared cut-off filter 70.

Aspherical values of the optical system configuring the lens module 800 will hereinafter be described with reference to FIG. 32.

In FIG. 32, a horizontal axis of the table refers to Surface Nos. of the first to sixth lenses 810 to 860, and a vertical axis of the table refers to characteristics corresponding to each lens surface.

Figure 33:
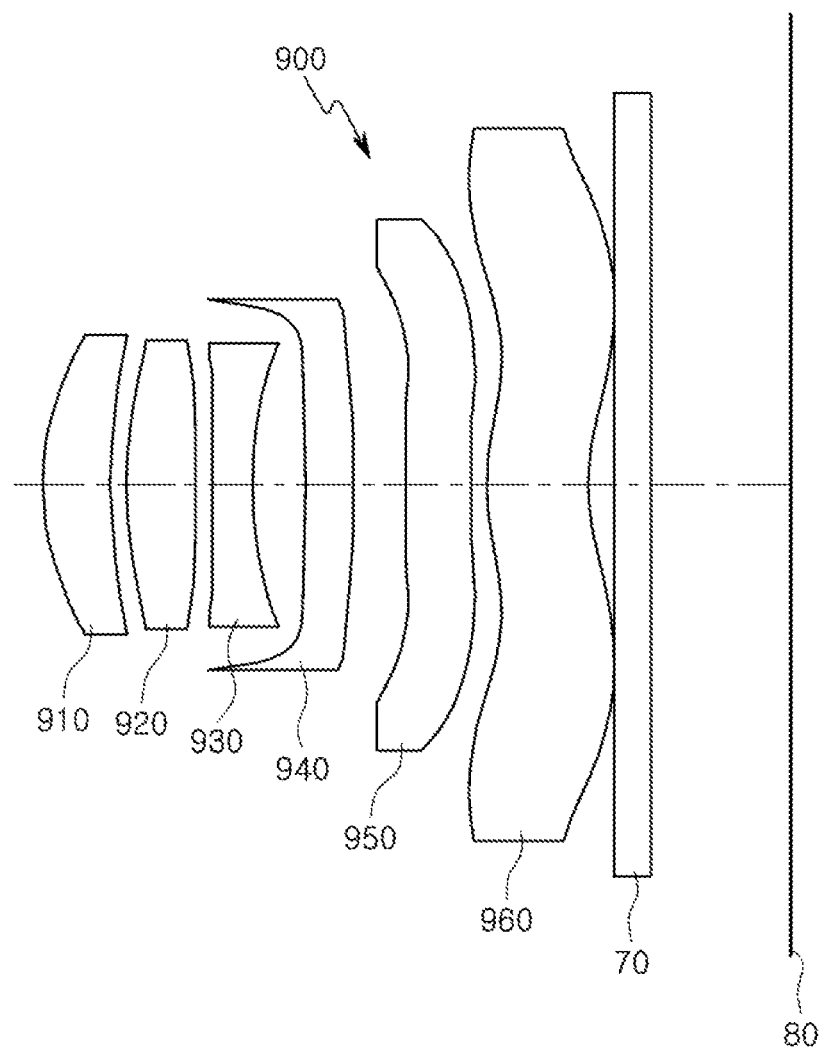
FIG. 33 is a configuration diagram of a lens module according to a ninth exemplary embodiment of the present disclosure.

A lens module according to a ninth exemplary embodiment of the present disclosure will hereinafter be described with reference to FIG. 33.

A lens module 900 may include an optical system including a first lens 910, a second lens 920, a third lens 930, a fourth lens 940, a fifth lens 950, and a sixth lens 960. In addition, the lens module 900 may further include an infrared cut-off filter 70 and an image sensor 80. Further, the lens module 900 may further include at least one stop. For example, the stop may be disposed between the second and third lenses 920 and 930. However, the stop may be disposed in front of the first lens 910, between the first lens 910 and the second lens 920 or anywhere between the third lens 930 and the sixth lens 960.

In the exemplary embodiment of the present disclosure, the first lens 910 may have positive refractive power. However, the first lens 910 may have negative refractive power. An object-side surface of the first lens 910 may be convex and an image-side surface of the first lens 910 may be concave. The second lens 920 may have positive refractive power. However, the second lens 920 may have negative refractive power. An object-side surface of the second lens 920 may be convex and an image-side surface of the second lens 920 maybe convex. The third lens 930 may have negative refractive power. However, the third lens 930 may have positive refractive power. An object-side surface of the third lens 930 may be convex and an image-side surface of the third lens 930 may be concave. The fourth lens 940 may have positive refractive power. However, the fourth lens 940 may have negative refractive power. An object-side surface of the fourth lens 940 may be convex and an image-side surface of the fourth lens 940 maybe convex. The fifth lens 950 may have negative refractive power. However, the fifth lens 950 may have positive refractive power. An object-side surface of the fifth lens 950 may be concave and an image-side surface of the fifth lens 950 may be convex. The sixth lens 960 may have positive refractive power. However, the sixth lens 960 may have negative refractive power. An object-side surface of the sixth lens 960 may be convex and an image-side surface of the sixth lens 960 may be concave. In addition, one or more inflection points may be formed on at least one or each of the object-side surface and the image-side surface of the sixth lens 960.

Aberration characteristics of the lens module 900 of the ninth exemplary embodiment will hereinafter be described with reference to FIG. 34.

Figure 34:
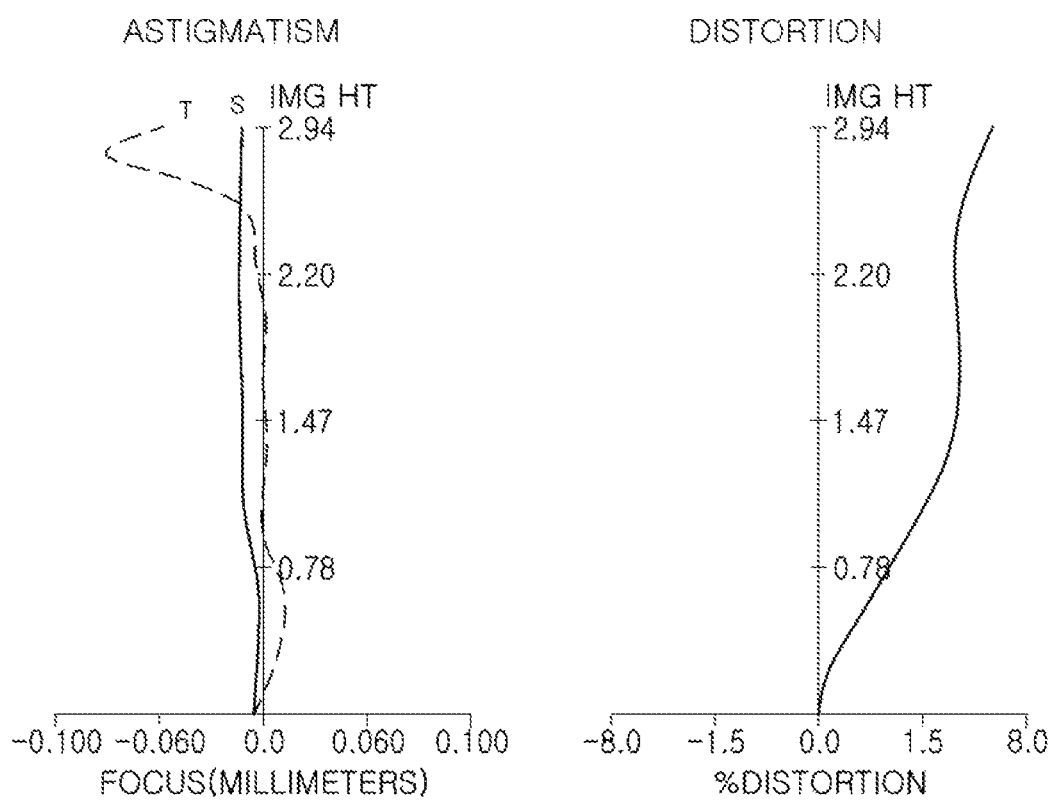
FIG. 34 is a curve illustrating aberration characteristics of the lens module illustrated in FIG. 33.

The lens module 900 may have substantially constant astigmatism from the center of the image-sensing surface to an edge thereof, as illustrated in FIG. 34.

Exemplary characteristics of the optical system configuring the lens module 900 will hereinafter be described with reference to FIG. 35.

In FIG. 35, Surface Nos. 2 and 3 indicate the first and second surfaces of the first lens 910, respectively, and Surface Nos. 4 and 5 indicate the first and second surfaces of the second lens 920, respectively. In a similar scheme, Surface Nos. 7 to 14 indicate first and second surfaces of the third to sixth lenses 930 to 960, respectively. Meanwhile, Surface No. 6 indicates the stop, and Surface Nos. 15 and 16 indicate first and second surfaces of the infrared cut-off filter 70.

Aspherical values of the optical system configuring the lens module 900 will hereinafter be described with reference to FIG. 36.

In FIG. 36, a horizontal axis of the table refers to Surface Nos. of the first to sixth lenses 910 to 960, and a vertical axis refers to characteristics corresponding to each lens surface.

Figure 37:
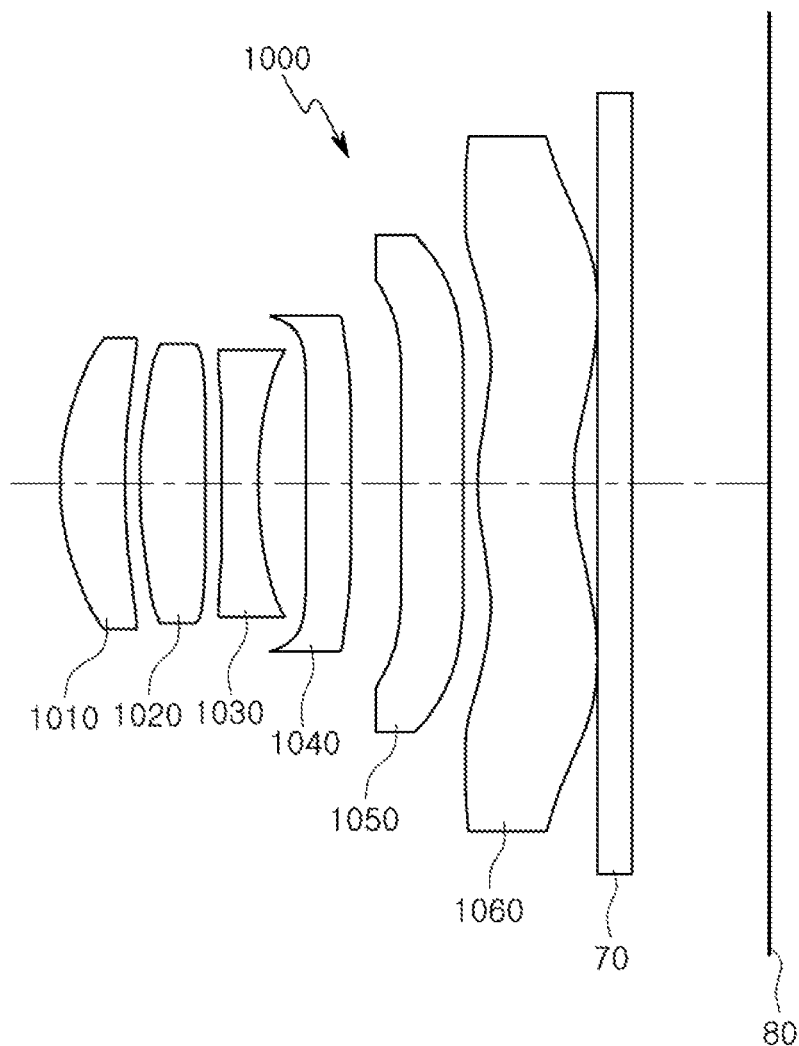
FIG. 37 is a configuration diagram of a lens module according to a tenth exemplary embodiment of the present disclosure.

A lens module according to a tenth exemplary embodiment of the present disclosure will hereinafter be described with reference to FIG. 37.

A lens module 1000 may include an optical system including a first lens 1010, a second lens 1020, a third lens 1030, a fourth lens 1040, a fifth lens 1050, and a sixth lens 1060. In addition, the lens module 1000 may further include an infrared cut-off filter 70 and an image sensor 80. Further, the lens module 1000 may further include at least one stop. For example, the stop may be disposed between the second and third lenses 1020 and 1030. However, the stop may be disposed in front of the first lens 1010, between the first lens 1010 and the second lens 1020 or anywhere between the third lens 1030 and the sixth lens 1060.

In the exemplary embodiment of the present disclosure, the first lens 1010 may have positive refractive power. However, the first lens 1010 may have negative refractive power. An object-side surface of the first lens 1010 may be convex and an image-side surface of the first lens 1010 may be concave. The second lens 1020 may have positive refractive power. However, the second lens 1020 may have negative refractive power. An object-side surface of the second lens 1020 may have positive refractive power may be convex and an image-side surface of the second lens 1020 may be convex. The third lens 1030 may have negative refractive power. However, the third lens 1030 may have positive refractive power. An object-side surface of the third lens 1030 may be convex and an image-side surface of the third lens 1030 may be concave. The fourth lens 1040 may have positive refractive power. However, the fourth lens 1040 may have negative refractive power. An object-side surface of the fourth lens 1040 may be convex and an image-side surface of the fourth lens 1040 may be convex. The fifth lens 1050 may have negative refractive power. However, the fifth lens 1050 may have positive refractive power. An object-side surface of the fifth lens 1050 may be concave while an image-side surface of the fifth lens 1050 may be convex. The sixth lens 1060 may have positive refractive power. However, the sixth lens 1060 may have negative refractive power. An object-side surface of the sixth lens 1060 may be convex and an image-side surface of the sixth lens 1060 may be concave. In addition, one or more inflection points may be formed on at least one or each of the object-side surface and the image-side surface of the sixth lens 1060.

Aberration characteristics of the lens module 1000 of the tenth exemplary embodiment will hereinafter be described with reference to FIG. 38.

Figure 38:
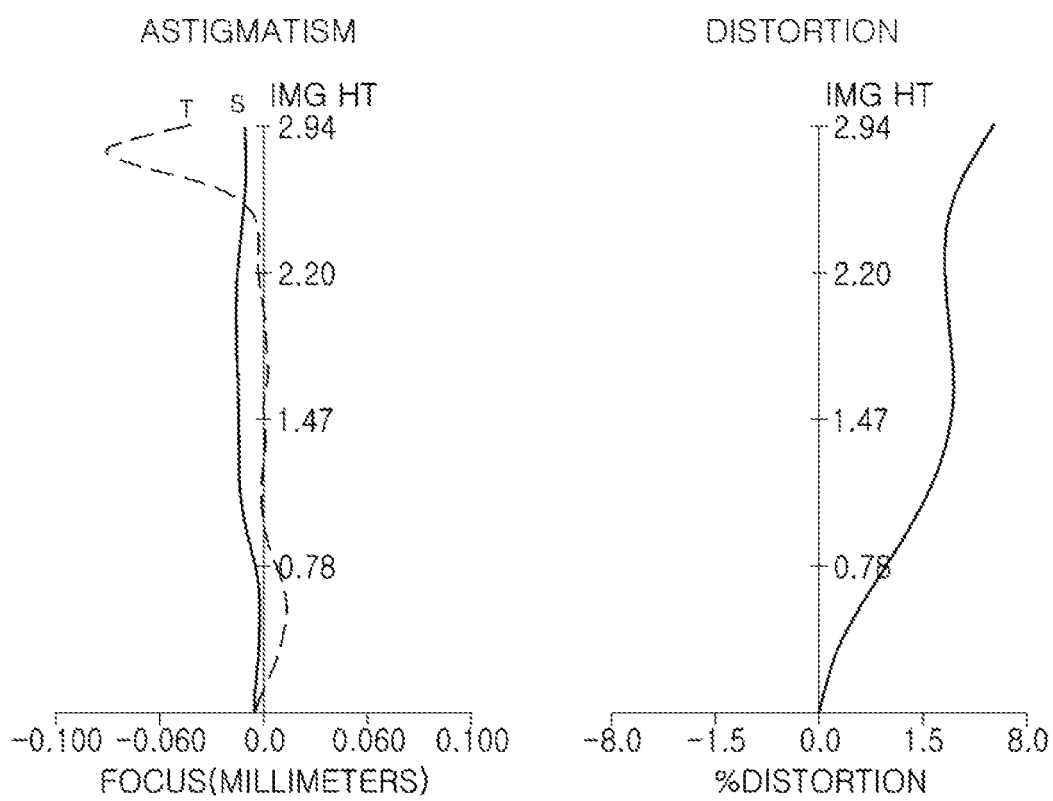
FIG. 38 is a curve illustrating aberration characteristics of the lens module illustrated in FIG. 37.

The lens module 1000 may have substantially constant astigmatism from the center of the image-sensing surface to an edge thereof, as illustrated in FIG. 38.

Exemplary characteristics of the optical system configuring the lens module 1000 will hereinafter be described with reference to FIG. 39.

In FIG. 39, Surface Nos. 2 and 3 indicate the first and second surfaces of the first lens 1010, respectively, and Surface Nos. 4 and 5 indicate the first and second surfaces of the second lens 1020, respectively. In a similar scheme, Surface Nos. 7 to 14 indicate first and second surfaces of the third to sixth lenses 1030 to 1070, respectively. Meanwhile, Surface No. 6 indicates the stop, and Surface Nos. 15 and 16 indicate first and second surfaces of the infrared cut-off filter 70.

Aspherical values of the optical system configuring the lens module 1000 of the tenth exemplary embodiment will hereinafter be described with reference to FIG. 40.

In FIG. 40, a horizontal axis of the table refers to Surface Nos. of the first to sixth lenses 1010 to 1060, and a vertical axis of the table refers to characteristics corresponding to each lens surface.

Table 3 (shown below) shows optical characteristics of the lens modules according to the eighth to tenth exemplary embodiments in the present disclosure. As seen in Table 3, the lens modules may substantially have an F No. of 2.10 to 2.3. In addition, the lens module may substantially have an overall focal length (f) of 4.0 to 4.3. In the lens module, a focal length (f1) of the first lens may be substantially within a range of 5.6 to 6.6. In the lens module, a focal length (f2) of the second lens may be substantially within a range of 4.0 to 4.9. In the lens module, a focal length (f3) of the third lens may be substantially within a range of −4.6 to −4.1. In the lens module, a focal length (f4) of the fourth lens may be substantially within a range of 20.0 to 23.0. In the lens module, a focal length (f5) of the fifth lens may be substantially within a range of −30 to 30. In the lens module, a focal length (f6) of the sixth lens may be substantially within a range of −10.0 to 110.0. In the lens module, an overall length of the optical system may be substantially within a range of 4.5 to 5.0. In the lens module, BFL may be substantially within a range of 1.0 to 1.4. In the lens module, a field of view (ANG) of the optical system may be substantially within a range of 68 to 72 degrees. In the lens module, a radius (EPD/2) of an entrance pupil may be substantially within a range of 0.6 to 0.8.

TABLE 3

|  | Eighth Exemplary Embodiment | Ninth Exemplary Embodiment | Tenth Exemplary Embodiment |
| --- | --- | --- | --- |
| Fno | 2.16 | 2.15 | 2.19 |
| f (EFL) | 4.106 | 4.096 | 4.163 |
| f1 | 6.442 | 6.229 | 5.749 |
| f2 | 4.284 | 4.474 | 4.790 |
| f3 | −4.519 | −4.411 | −4.232 |
| f4 | 21.43 | 21.43 | 21.43 |
| f5 | 26.11 | −27.49 | −28.67 |
| f6 | −7.751 | 999.8 | 99.98 |
| OAL | 4.724 | 4.754 | 4.806 |
| BFL | 1.102 | 1.275 | 1.327 |
| ANG | 69.7 | 69.8 | 69.0 |
| EPD/2 | 0.67 | 0.68 | 0.67 |

Table 4 (shown below) shows numerical ranges of Conditional Expressions and values of Conditional Expressions of the lens modules according to the eighth to tenth exemplary embodiments in the present disclosure.

TABLE 4

|  | Conditional Expression | Eighth Exemplary Embodiment | Ninth Exemplary Embodiment | Tenth Exemplary Embodiment |
| --- | --- | --- | --- | --- |
| 1 | 1.3 < f1/f < 2.5 | 1.57 | 1.52 | 1.38 |
| 2 | 32.0 < v1 − v3 | 32.9 | 32.9 | 32.9 |
| 3 | 30.0 < v1 − v4 | 32.9 | 32.9 | 32.9 |
| 4 | 32.0 < v1 − v5 | 32.9 | 32.9 | 32.9 |

TABLE 4-continued

| Conditional Expression | Eighth Exemplary Embodiment | Ninth Exemplary Embodiment | Tenth Exemplary Embodiment |
|---|---|---|---|
| 5  0.9 < f2/f | 1.04 | 1.09 | 1.15 |
| 6  f3/f < −0.9 | −1.10 | −1.08 | −1.02 |
| 7  3.0 < f4/f | 5.22 | 5.23 | 5.15 |
| 8  f5/f < −3.0 | 6.36 | −6.71 | −6.89 |
| 9  1.1 < OAL/f | 1.14 | 1.15 | 1.15 |
| 10  1.4 < f1/f2 < 5.0 | 1.50 | 1.39 | 1.20 |
| 11  f2/f3 < 0.8 | −0.95 | −1.01 | −1.13 |
| 12  0.25 < BFL/f < 0.35 | 0.27 | 0.31 | 0.32 |
| 13  0.02 < D12/f | 0.02 | 0.02 | 0.03 |
| 14  0.3 < r1/f < 0.8 | 0.40 | 0.40 | 0.39 |
| 15  2.0 < r5/f | 7.31 | 7.32 | 7.21 |
| 16  4.0 < r9/f | 7.31 | 7.32 | 7.21 |
| 17  0.1 < EPD/2/f1 | 0.15 | 0.15 | 0.17 |
| 18  0.75 < AL/ImgH/ < 0.85 | 0.80 | 0.80 | 0.81 |

As seen in Table 4, the lens modules according to the eight to tenth exemplary embodiments in the present disclosure may substantially satisfy one or more of the Conditional Expressions above, similar to the lens modules according to the first to seventh exemplary embodiments in the present disclosure.

As set forth above, according to exemplary embodiments in the present disclosure, relatively high resolution may be implemented, and a length of the lens module may be shortened.

While exemplary embodiments have been shown and described above, it will be apparent to those skilled in the art that modifications and variations could be made without departing from the scope of the present invention as defined by the appended claims.

What is claimed is:

1. A lens module comprising:
   a first lens having refractive power and a convex object-side surface;
   a second lens having refractive power and a convex object-side surface;
   a third lens having refractive power and a convex object-side surface;
   a fourth lens having refractive power and biconvex surfaces;
   a fifth lens having refractive power and a convex image-side surface; and
   a sixth lens having refractive power and a concave image-side surface, one or more inflection points being formed on the image-side surface of the sixth lens,
   wherein the first to sixth lenses are sequentially disposed from an object side to an image side, and
   wherein a focal length of the first lens is within a range of 5.6 mm to 6.6 mm.

2. The lens module of claim 1, wherein the first lens has a concave image-side surface.

3. The lens module of claim 1, wherein the second lens has a convex image-side surface.

4. The lens module of claim 1, wherein the third lens has a concave image-side surface.

5. The lens module of claim 1, wherein the fifth lens has a concave object-side surface.

6. The lens module of claim 1, wherein the sixth lens has a convex object-side surface.

7. The lens module of claim 1, wherein the refractive power of the fifth lens is negative.

8. The lens module of claim 1, wherein the following Conditional Expression is satisfied:
   $1.3 < f1/f < 2.5$
   where f1 is a focal length of the first lens, and f is an overall focal length of an optical system including the first to sixth lenses.

9. The lens module of claim 1, wherein the following Conditional Expression is satisfied:
   $32.0 < V1-V3$
   where V1 is an Abbe number of the first lens, and V3 is an Abbe number of the third lens.

10. The lens module of claim 1, wherein the following Conditional Expression is satisfied:
    $30.0 < V1-V4$
    where V1 is an Abbe number of the first lens, and V4 is an Abbe number of the fourth lens.

11. The lens module of claim 1, wherein the following Conditional Expression is satisfied:
    $32.0 < V1-V5$
    where V1 is an Abbe number of the first lens, and V5 is an Abbe number of the fifth lens.

12. The lens module of claim 1, wherein the following Conditional Expression is satisfied:
    $0.9 < f2/f$
    where f2 is a focal length of the second lens, and f is an overall focal length of an optical system including the first to sixth lenses.

13. The lens module of claim 1, wherein the following Conditional Expression is satisfied:
    $f3/f < -0.9$
    where f3 is a focal length of the third lens, and f is an overall focal length of an optical system including the first to sixth lenses.

14. The lens module of claim 1, wherein the following Conditional Expression is satisfied:
    $3.0 < f4/f$
    where f4 is a focal length of the fourth lens, and f is an overall focal length of an optical system including the first to sixth lenses.

15. The lens module of claim 1, wherein the following Conditional Expression is satisfied:
    $f5/f < -3.0$
    where f5 is a focal length of the fifth lens, and f is an overall focal length of an optical system including the first to sixth lenses.

16. The lens module of claim 1, wherein the following Conditional Expression is satisfied:
    $1.1 < OAL/f$
    where OAL is a distance from the object-side surface of the first lens to an image-sensing surface, and f is an overall focal length of an optical system including the first to sixth lenses.

17. The lens module of claim 1, wherein the following Conditional Expression is satisfied:
    $1.4 < f1/f2 < 5.0$
    where f1 is a focal length of the first lens, and f2 is a focal length of the second lens.

18. The lens module of claim 1, wherein the following Conditional Expression is satisfied:
    $f2/f3 < 0.8$
    where f2 is a focal length of the second lens, and f3 is a focal length of the third lens.

19. The lens module of claim 1, wherein the following Conditional Expression is satisfied:
    $0.25 < BFL/f < 0.35$
    where BFL (Back Focus Length) is a distance from the image-side surface of the sixth lens to an image-sensing surface, and f is an overall focal length of an optical system including the first to sixth lenses.

20. The lens module of claim 1, wherein the following Conditional Expression is satisfied:

$$0.02 < D12/f$$

where D12 is a gap between the first and second lenses, and f is an overall focal length of an optical system including the first to sixth lenses.

* * * * *